United States Patent
Yoshimatsu

(10) Patent No.: US 8,401,073 B2
(45) Date of Patent: Mar. 19, 2013

(54) INVERSE QUANTIZATION CIRCUIT, INVERSE QUANTIZATION METHOD AND IMAGE REPRODUCING APPARATUS

(75) Inventor: Naoki Yoshimatsu, Aichi (JP)

(73) Assignee: Panasonic Corporation, Osaka (JP)

( * ) Notice: Subject to any disclaimer, the term of this patent is extended or adjusted under 35 U.S.C. 154(b) by 1059 days.

(21) Appl. No.: 12/438,927

(22) PCT Filed: Feb. 26, 2008

(86) PCT No.: PCT/JP2008/000345
§ 371 (c)(1),
(2), (4) Date: Feb. 25, 2009

(87) PCT Pub. No.: WO2008/120433
PCT Pub. Date: Oct. 9, 2008

(65) Prior Publication Data
US 2010/0014582 A1  Jan. 21, 2010

(30) Foreign Application Priority Data

Mar. 28, 2007 (JP) .................... 2007-083751

(51) Int. Cl.
*H04N 7/12* (2006.01)
*H04N 11/02* (2006.01)
(52) U.S. Cl. .............. 375/240.03; 375/240.25
(58) Field of Classification Search ............. 375/240.03, 375/240.25
See application file for complete search history.

(56) References Cited

U.S. PATENT DOCUMENTS

| 5,603,012 A | 2/1997 | Sotheran |
| 5,784,631 A | 7/1998 | Wise |
| 5,842,033 A | 11/1998 | Wise et al. |
| 6,018,776 A | 1/2000 | Wise |

(Continued)

FOREIGN PATENT DOCUMENTS

| EP | 1 351 515 | 10/2003 |
| EP | 1 599 049 | 11/2005 |

(Continued)

OTHER PUBLICATIONS

International Search Report issued May 20, 2008 in the International (PCT) Application No. PCT/JP2008/000345.

(Continued)

*Primary Examiner* — Techane Gergiso
(74) *Attorney, Agent, or Firm* — Wenderoth, Lind & Ponack, L.L.P.

(57) ABSTRACT

Provided are a versatile inverse quantization circuit which performs inverse quantization operable for various encoding systems by a single circuit, an inverse quantization method, and an image reproducing apparatus. A first multiplier generation unit (10) generates a first multiplier M1, a second multiplier generation unit (20) generates a second multiplier M2, a shift quantity generation unit (180) generates shift quantity data SF indicating a bit shift quantity, a multiplication unit (140) multiplies quantized coefficient data CD by the first multiplier M1 and the second multiplier M2, a shift unit (170) carries out bit shift operation in accordance with the shift quantity data SF, at least one of the multiplication unit (140) and the shift unit (170) determines whether or not to perform operation depending on the encoding system, and at least one of the first multiplier generation unit (10), the second multiplier generation unit (20) and the shift quantity generation unit (180) determines a value to be generated or a way of generating the value depending on the encoding system.

19 Claims, 9 Drawing Sheets

U.S. PATENT DOCUMENTS

| | | | |
|---|---|---|---|
| 6,035,126 A | 3/2000 | Wise et al. | |
| 6,678,423 B1* | 1/2004 | Trenary et al. | 382/250 |
| 2003/0035587 A1* | 2/2003 | Youn | 382/238 |
| 2005/0060147 A1* | 3/2005 | Norimatsu et al. | 704/230 |
| 2006/0222064 A1* | 10/2006 | Sherigar et al. | 375/240.03 |
| 2007/0160146 A1* | 7/2007 | Bright et al. | 375/240.16 |
| 2007/0183500 A1* | 8/2007 | Nagaraj et al. | 375/240.16 |
| 2007/0237236 A1* | 10/2007 | Chang et al. | 375/240.18 |
| 2008/0192838 A1* | 8/2008 | Chen et al. | 375/240.25 |

FOREIGN PATENT DOCUMENTS

| | | |
|---|---|---|
| EP | 1 708 511 | 10/2006 |
| JP | 6-125539 | 5/1994 |
| JP | 8-97725 | 4/1996 |
| JP | 2000-50263 | 2/2000 |
| JP | 2003-133961 | 5/2003 |
| JP | 2004-201345 | 7/2004 |
| JP | 2004-328480 | 11/2004 |
| JP | 2005-354307 | 12/2005 |

OTHER PUBLICATIONS

Supplementary European Search Report issued Aug. 1, 2011 in European Application No. EP 08 71 0498.

* cited by examiner

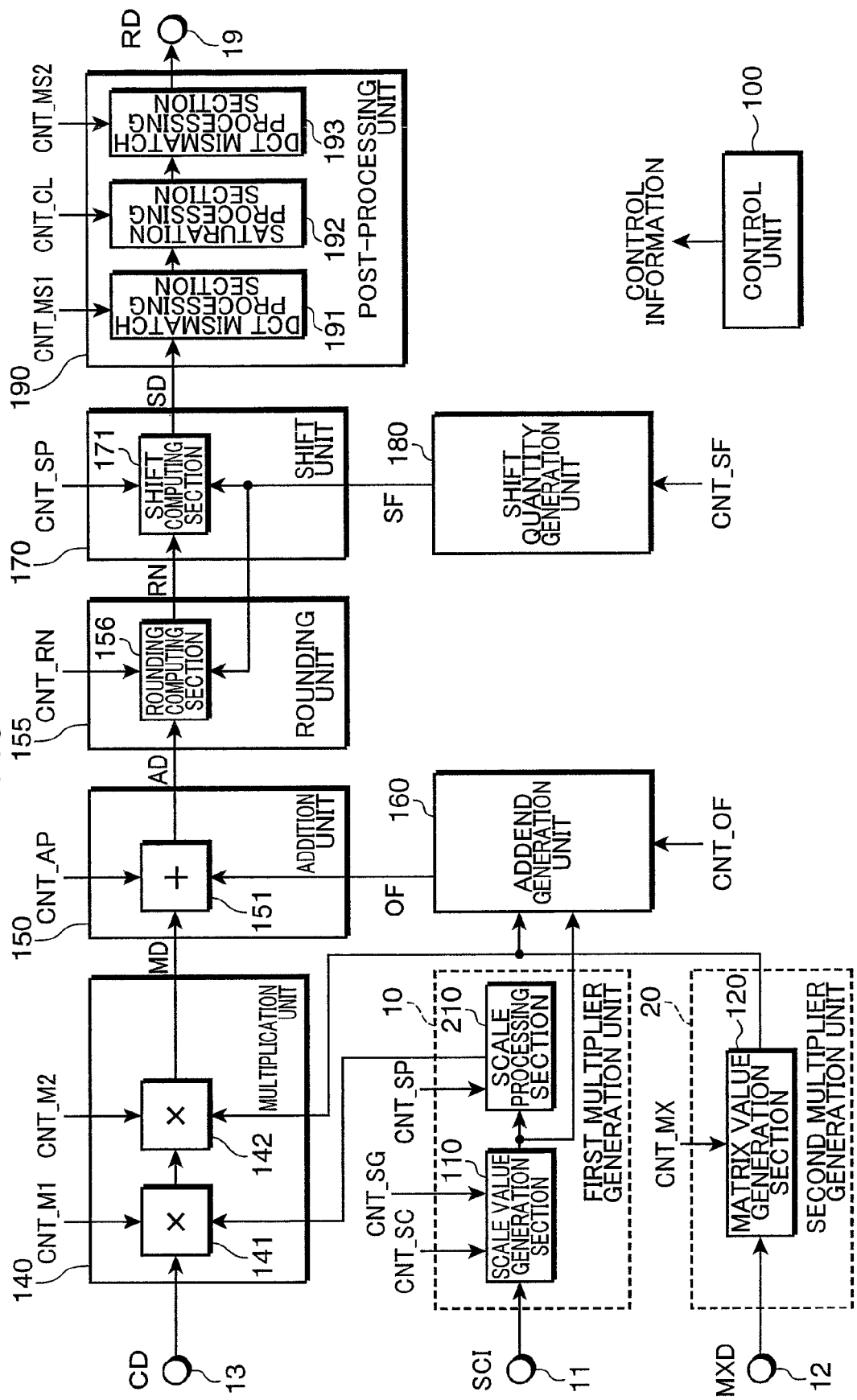

FIG.2

| ENCODING SYSTEM | CLASSIFICATION | INVERSE QUANTIZATION EXPRESSION |
|---|---|---|
| JPEG | | $R_{vu} = Sq_{vu} \times Q_{vu}$ |
| MPEG-1 | intra DC | $dct\_recon[0][0] = dct\_zz[0] \times 8$ |
| MPEG-1 | intra AC | $dct\_recon[m][n] = (2 \times dct\_zz[i] \times quantizer\_scale \times intra\_quant[m][n])/16$ |
| MPEG-1 | non-intra | $dct\_recon[m][n] = (((2 \times dct\_zz[i]) + Sign(dct\_zz[i])) \times quantizer\_scale \times non\_intra\_quant[m][n])/16$ |
| MPEG-2 | intra DC | $F''[0][0] = intra\_dc\_mult \times QF[0][0]$ |
| MPEG-2 | intra AC | $F''[v][u] = ((2 \times QF[v][u] + k) \times W[w][v][u] \times quantizer\_scale)/32$ |
| MPEG-2 | non-intra | where: $k = \begin{cases} 0 & \text{intra blocks} \\ Sign(QF[v][u]) & \text{non-intra blocks} \end{cases}$ |

FIG.3

| ENCODING SYSTEM | CLASSIFICATION | | INVERSE QUANTIZATION EXPRESSION |
|---|---|---|---|
| H.263 | intra DC | | — |
| | intra AC non-intra | | $\|REC\| = QUANT \times (2 \times \|LEVEL\| + 1)$    if QUANT = "odd"<br>$\|REC\| = QUANT \times (2 \times \|LEVEL\| + 1) - 1$ if QUANT = "even"<br>$REC = sign(LEVEL) \times \|REC\|$ |
| MPEG-4 | intra DC | | $F''[0][0] = dc\_scaler \times QF[0][0]$ |
| | intra AC non-intra | METHOD 1 | $F'[v][u] = \begin{cases} 0, & \text{if } QF[v][u] = 0 \\ ((2 \times QF[v][u] + k) \times W[v][u] \times quantizer\_scale) / 16, & \text{if } QF[v][u] \neq 0 \end{cases}$<br>where:<br>$k = \begin{cases} 0 & \text{intra blocks} \\ Sign(QF[v][u]) & \text{non-intra blocks} \end{cases}$ |
| | | METHOD 2 | $\|F''[v][u]\| = \begin{cases} 0, & \text{if } QF[v][u] = 0, \\ (2 \times \|QF[v][u]\| + 1) \times quantizer\_scale, & \text{if } QF[v][u] \neq 0, quantizer\_scale \text{ is odd}, \\ (2 \times \|QF[v][u]\| + 1) \times quantizer\_scale - 1, & \text{if } QF[v][u] \neq 0, quantizer\_scale \text{ is even}. \end{cases}$ |

FIG.4

| ENCODING SYSTEM | CLASSIFICATION | INVERSE QUANTIZATION EXPRESSION |
|---|---|---|
| MPEG-4AVC H.264 | luma DC for Intra16x16 | If QP'Y is greater than or equal to 36<br>$dcY_{ij} = (f_{ij} * \text{LevelScale}(QP'_Y \%6, 0, 0)) << ((QP'_Y/6-6))$, with $i,j = 0..3$<br>Otherwise (QP'Y is less than 36)<br>$dcY_{ij} = (f_{ij} * \text{LevelScale}(QP'_Y \%6, 0, 0) + 2^{5-QP'_Y/6}) >> (6-QP'_Y/6)$, with $i,j = 0..3$ |
| | chroma DC | $dcC_{ij} = ((f_{ij} * \text{LevelScale}(QP'_C \%6, 0, 0)) << ((QP'_C/6)) >> 5$, with $i,j = 0,1$ |
| | luma AC 4x4 blocks<br>chroma AC | If qP is greater than or equal to 24<br>$d_{ij} = (c_{ij} * \text{LevelScale}(qP \%6, i, j)) << ((qP/6-4))$, with $i,j = 0..3$ except as noted above<br>Otherwise (qP is less than 24)<br>$d_{ij} = (c_{ij} * \text{LevelScale}(qP \%6, i, j) + 2^{3-qP/6}) >> (4-qP/6)$, with $i,j = 0..3$ except as noted above |
| | luma AC for 8x8 blocks | If QP'Y is greater than or equal to 36<br>$d_{ij} = (c_{ij} * \text{LevelScale 8x8}(QP'_Y \%6, i, j)) << ((QP'_Y/6-6))$, with $i,j = 0..7$<br>Otherwise (QP'Y is less than 36)<br>$d_{ij} = (c_{ij} * \text{LevelScale8x8}(QP'_Y \%6, i, j) + 2^{5-QP'_Y/6}) >> (6-QP'_Y/6)$, with $i,j = 0..7$ |

FIG.5

| ENCODING SYSTEM | CLASSIFICATION | OPERATION CONFIGURATION |||||||||
|---|---|---|---|---|---|---|---|---|---|---|
| | | CD | M2 | | M1 | | Sign | OF | RN | SF |
| JPEG | — | {COEFFICIENT | * MATRIX | *( | 1 | )*( | SIGN | 0 | )+ 0 | ⇑⇑⇑⇑ |
| MPEG-1 | intra DC | {COEFFICIENT | * 1 | *( | 8 | )*( | SIGN | 0 | )+ 0 | ⇑⇑⇑⇑ |
| | intra AC | {COEFFICIENT | * MATRIX | *( | 2 * SCALE | )*( | SIGN | 0 | )+ 0 | SHIFT ⇑⇑ POST |
| | non-intra | {COEFFICIENT | * MATRIX | *( | 2 * SCALE | )*( | SIGN | *(MATRIX * SCALE) | )+ 0 | SHIFT ⇑⇑ POST |
| MPEG-2 | intra DC | {COEFFICIENT | * 1 | *( | SCALE | )*( | SIGN | 0 | )+ 0 | ⇑⇑⇑ POST |
| | intra AC | {COEFFICIENT | * MATRIX | *( | 2 * SCALE | )*( | SIGN | 0 | )+ 0 | ⇑⇑⇑ POST |
| | non-intra | {COEFFICIENT | * MATRIX | *( | 2 * SCALE | )*( | SIGN | *(MATRIX * SCALE) | )+ 0 | ⇑⇑⇑ POST |
| H.263 | intra DC | ⇒INVERSE-QUANTIZED AT TIME OF VARIABLE LENGTH DECODING |||||||||
| | intra AC | {COEFFICIENT | * 1 | *( | 2 * SCALE | )+ | 1 | *( SCALE | )+ 0 | ⇑⇑⇑ POST |
| MPEG-4 | intra DC | ⇒OUTPUT 0 |||||||||
| | intra AC non-intra METHOD 1 · COEFFICIENT=0/ intra · COEFFICIENT<>0/ intra · COEFFICIENT<>0/ non-intra | {COEFFICIENT | * 1 | *( | SCALE | )*( | 1 | *( SCALE | )+ 0 | ⇑⇑⇑ POST |
| | METHOD 2 | {COEFFICIENT | * MATRIX | *( | 2 * SCALE | )+ | 0 | *(MATRIX * SCALE) | )+ 0 | ⇑⇑⇑ POST |
| | — | {COEFFICIENT | * MATRIX | *( | 2 * SCALE | )*( | SIGN | *(MATRIX * SCALE) | )+ 0 | ⇑⇑⇑ POST |
| | — | {COEFFICIENT | * MATRIX | *( | 2 * SCALE | )*( | SIGN | *(MATRIX * SCALE) | )+ 0 | ⇑⇑⇑ POST |
| H.264 | NO ROUNDING | {COEFFICIENT | * MATRIX | *( | NORMALIZATION | )*( | SIGN | 0 | )+ 0 | SHIFT ⇑⇑ |
| | WITH ROUNDING | {COEFFICIENT | * MATRIX | *( | NORMALIZATION | )*( | SIGN | 0 | )+ ROUNDING | SHIFT ⇑⇑ |

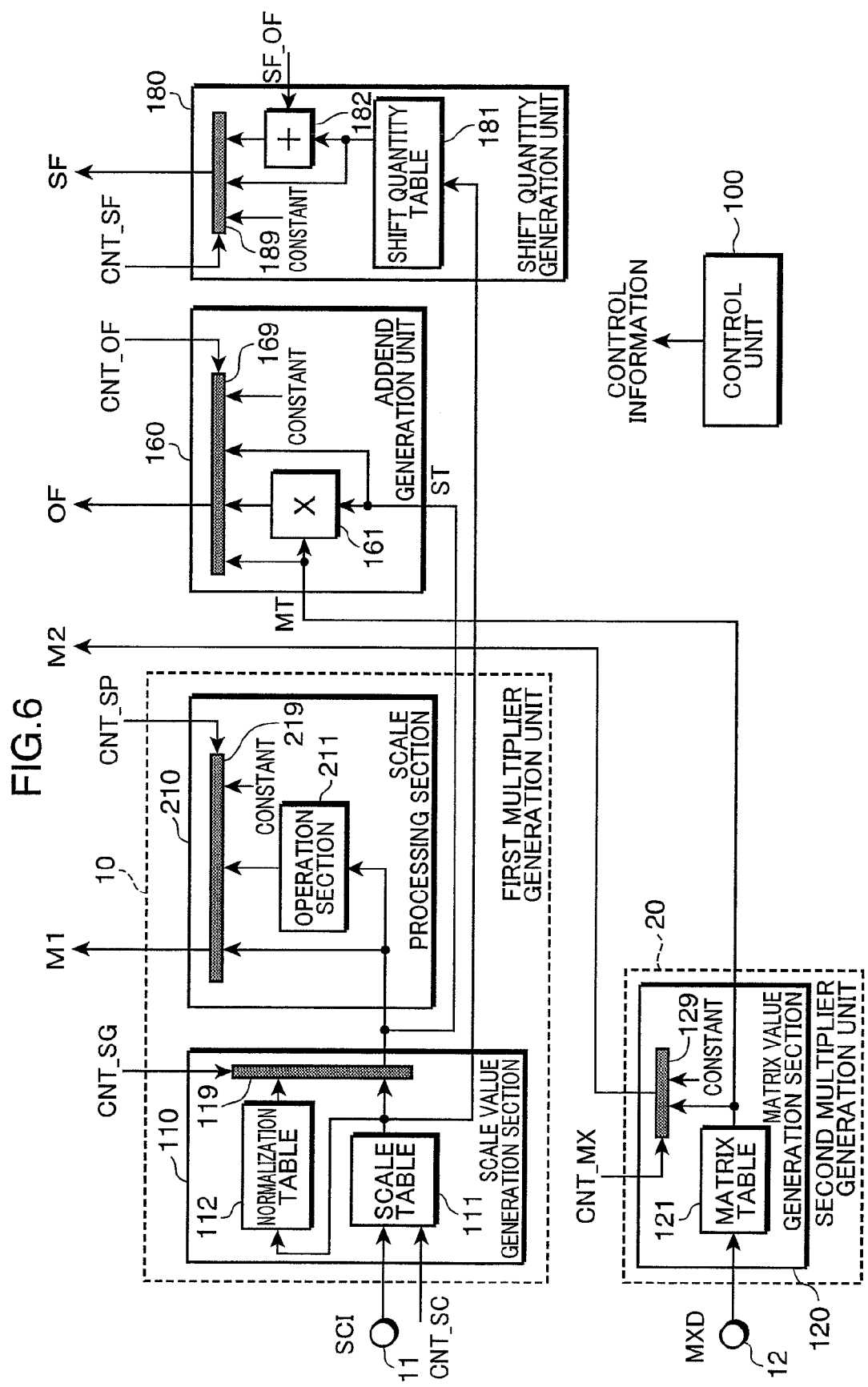

FIG.8

| ENCODING SYSTEM | CLASSIFICATION | | OPERATION CONFIGURATION |
|---|---|---|---|
| JPEG | — | | {[COEFFICIENT] * 1 + 0 )* [MATRIX] * 1 + 0 }* ⇑ ⇑ ⇑ |
| MPEG-1 | intra DC | | {[COEFFICIENT] * 1 + 0 )* 1 * 8 + 0 }* ⇑ ⇑ ⇑ |
| | intra AC | | {[COEFFICIENT] * [2] + 0 )* [MATRIX] * [SCALE] + 0 }* [SHIFT] ⇑ ⇑ |
| | non-intra | | {[COEFFICIENT] * [2] + [SIGN] )* [MATRIX] * [SCALE] + [ADDEND] }* [SHIFT] ⇑ [CLIP] ⇑ ⇑ [DCT MISS] |
| MPEG-2 | intra DC | | {[COEFFICIENT] * 1 + 0 )* 1 * [SCALE] + 0 }* ⇑ ⇑ [CLIP] ⇑ ⇑ [DCT MISS] |
| | intra AC | | {[COEFFICIENT] * [2] + [SIGN] )* [MATRIX] * [SCALE] + 0 }* [SHIFT] ⇑ [CLIP] ⇑ ⇑ [DCT MISS] |
| | non-intra | | {[COEFFICIENT] * [2] + [SIGN] )* [MATRIX] * [SCALE] + 0 }* [SHIFT] ⇑ [CLIP] ⇑ ⇑ [DCT MISS] |
| H.263 | intra DC | | ⇒INVERSE-QUANTIZED AT TIME OF VARIABLE LENGTH DECODING |
| | intra AC | | {[COEFFICIENT] * [2] + [SIGN] )* 1 * [SCALE] + 0 }* ⇑ ⇑ [CLIP] ⇑ ⇑ |
| MPEG-4 | intra DC | | ⇒OUTPUT 0 |
| | | METHOD 1: COEFFICIENT=0 intra AC non-intra | {[COEFFICIENT] * 1 + 0 )* [MATRIX] * [SCALE] + 0 }* ⇑ ⇑ [CLIP] ⇑ ⇑ |
| | | COEFFICIENT<>0 intra | {[COEFFICIENT] * [2] + [SIGN] )* [MATRIX] * [SCALE] + 0 }* [SHIFT] ⇑ [CLIP] ⇑ ⇑ |
| | | COEFFICIENT<>0 non-intra | {[COEFFICIENT] * [2] + [SIGN] )* [MATRIX] * [SCALE] + 0 }* [SHIFT] ⇑ [CLIP] ⇑ ⇑ |
| | | METHOD 2 | {[COEFFICIENT] * 1 + 0 )* [MATRIX] * [SCALE] + 0 }* ⇑ ⇑ ⇑ ⇑ ⇑ |
| H.264 | NO ROUNDING | | {[COEFFICIENT] * 1 + 0 )* [MATRIX] * [NORMALIZATION] + 0 }* [SHIFT] ⇑ ⇑ ⇑ ⇑ |
| | WITH ROUNDING | | {[COEFFICIENT] * 1 + 0 )* [MATRIX] * [NORMALIZATION] + [ADDEND] }* [SHIFT] ⇑ ⇑ ⇑ ⇑ |

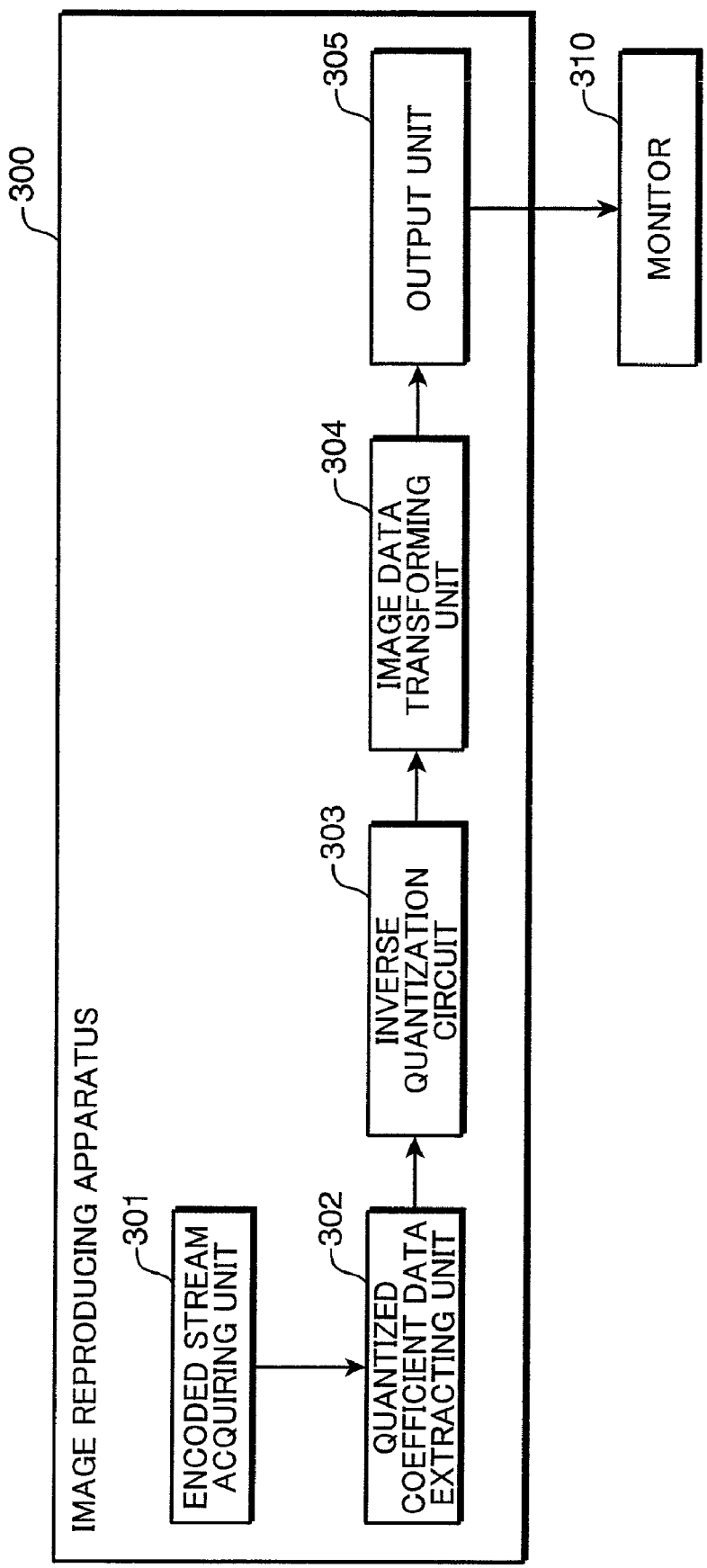

INVERSE QUANTIZATION CIRCUIT, INVERSE QUANTIZATION METHOD AND IMAGE REPRODUCING APPARATUS

TECHNICAL FIELD

The present invention relates to an inverse quantization circuit, an inverse quantization method and an image reproducing apparatus in decoding based on an image encoding system.

BACKGROUND ART

A variety of multimedia services are widely coming into practical use with increasingly faster networks, rapid widespread use of personal computers and digital television receivers or the like among general households in recent years. Above all, digital broadcasting systems and content delivery systems using the Internet or the like generally compress and encode content data such as video and sound based on standards such as an MPEG (Moving Picture Experts Group) system, use fractions of encoded data, which are compressed and encoded content data, as packets, transmit a set of packets as a stream signal or record the encoded data into a hard disk, DVD or memory card or the like. Furthermore, information devices such as a personal computer, set top box, portable information terminal apparatus or mobile phone that receive such a stream signal extract encoded data included in the stream signal, perform decoding on the extracted encoded data and thereby reproduce the content data.

Among such image compressing and encoding systems, there is a JPEG (Joint Photographic Experts Group) system, which is widely used for digital cameras or the like as a system for compressing and encoding still images. On the other hand, as a system for compressing and encoding video images, there is an MPEG-1 system for recording moving images into a CD-ROM or the like. In this way, basic techniques such as an image compression/encoding technique based on, for example, discrete cosine transform have been established. Based on such basic techniques, for example, an MPEG-2 system used, for example, for digital broadcasting, MPEG-4 system used for content using the Internet and MPEG-4AVC system intended for higher compression/encoding are used as standard systems in the fields handling image signals.

The basic algorithm of such image compression/encoding is a hybrid compression/encoding system that combines a motion compensation prediction system with the above described discrete cosine transform system. The hybrid compression/encoding system performs image compression/encoding on an image by combining both data obtained by applying discrete cosine transform to data itself within one picture and data obtained by applying discrete cosine transform to motion compensation inter-picture prediction data.

Furthermore, discrete cosine transform is performed in units of a block called "macro block." Each pixel data making up this macro block is transformed into a plurality of coefficient values indicating amplitude magnitude per frequency from a DC component to a high-frequency component through discrete cosine transform. Furthermore, each coefficient value is quantized using a technique based on each compression/encoding system. Images are compressed/encoded based on such an algorithm. Furthermore, images can be reconstructed by performing decoding in association with compression/encoding on the data generated by compression/encoding. Specifically, pixel data can be reconstructed in macro block units by performing inverse quantization on quantized coefficient data, which is a quantized coefficient value, and applying inverse discrete cosine transform to the data reconstructed through inverse quantization.

On the other hand, since various image compression/encoding systems are proposed in this way, there are conventional proposals of apparatuses provided with a circuit for compression/encoding so as to support different compression/encoding systems in one apparatus such as a personal computer and portable information terminal apparatus. For example, Patent Document 1 proposes a technique of an image decoder provided with a H.263 system inverse quantization unit and an MPEG-2 system inverse quantization unit so as to perform inverse quantization by switching between the respective inverse quantization units according to quantized coefficient data based on the respective encoding systems.

However, individually configuring the respective inverse quantization units based on the respective encoding systems as in the case of the conventional image decoder causes the problems that: the circuit scale increases; and if a new encoding system is proposed, for example, it is difficult to speedily respond to the proposal and an LSI (large scale integrated circuit) or the like for performing decoding needs to be redesigned.

Patent Document 1: Japanese Patent Laid-Open No. 2004-201345

DISCLOSURE OF THE INVENTION

The present invention has been implemented to solve the above described problems and it is an object of the present invention to provide an inverse quantization circuit, an inverse quantization method and an image reproducing apparatus which have a high degree of versatility and are capable of performing inverse quantization in association with various image encoding systems by a single circuit.

The inverse quantization circuit according to an aspect of the present invention is an inverse quantization circuit that performs inverse quantization by applying operation to quantized coefficient data resulting from quantization of a coefficient value per frequency obtained by transforming image data based on an encoding system and thereby reconstructs the coefficient value, including a first multiplier generation unit that generates a first multiplier for application of the operation to the quantized coefficient data, a second multiplier generation unit that generates a second multiplier for application of the operation to the quantized coefficient data, a shift quantity generation unit that generates shift quantity data indicating a bit shift quantity for application of the operation to the quantized coefficient data, a multiplication unit that multiplies the quantized coefficient data by the first multiplier generated by the first multiplier generation unit and the second multiplier generated by the second multiplier generation unit, and a shift unit that performs bit shift operation to data outputted from the multiplication unit according to the shift quantity data generated by the shift quantity generation unit, wherein at least one of the multiplication unit and the shift unit determines whether or not to perform the operation depending on the encoding system and/or at least one of the first multiplier generation unit, the second multiplier generation unit and the shift quantity generation unit determines a value to be generated or a way of generating the value depending on the encoding system.

According to this configuration, a first multiplier for applying operation to quantized coefficient data is generated, a second multiplier for applying operation to the quantized coefficient data is generated and shift quantity data indicating a bit shift quantity for applying operation to the quantized coefficient data is generated. The multiplication unit then multiplies the quantized coefficient data by the first multiplier and the second multiplier, and the shift unit performs bit shift operation to the data outputted from the multiplication unit according to the shift quantity data. At least one of the multiplication unit and shift unit determines whether or not to perform operation depending on the encoding system. Furthermore, at least one of the first multiplier generation unit, the second multiplier generation unit and the shift quantity generation unit determines a value to be generated or a way of generating the value depending on the encoding system.

The present invention determines whether or not to perform operation and a value to be generated or a way of generating the value depending on the encoding system, and can thereby perform inverse quantization in association with various encoding systems by a single circuit, reduce the circuit scale and also speedily respond to a case where a new encoding system is proposed. Furthermore, the present invention eliminates the necessity for redesigning an LSI for performing decoding, and can thereby provide a versatile inverse quantization circuit.

The object, features and advantages of the present invention will be made more obvious with the following detailed explanations and attached drawings.

BRIEF DESCRIPTION OF THE DRAWINGS

FIG. 1 is a block diagram showing a configuration of an inverse quantization circuit according to Embodiment 1 of the present invention;

FIG. 2 shows an inverse quantization expression according to a JPEG system, MPEG-1 system and MPEG-2 system;

FIG. 3 shows an inverse quantization expression according to an H.263 system and MPEG-4;

FIG. 4 shows an inverse quantization expression according to an H.264 system;

FIG. 5 shows a list of operation for each inverse quantization circuit in the inverse quantization circuit according to Embodiment 1 of the present invention;

FIG. 6 is a block diagram showing detailed configurations of the first multiplier generation unit, second multiplier generation unit, addend generation unit and shift quantity generation unit shown in FIG. 1;

FIG. 8 shows a list of operation for each inverse quantization expression in the inverse quantization circuit according to Embodiment 2 of the present invention; and FIG. 9 is a block diagram showing a configuration of an image reproducing apparatus according to Embodiment 3 of the present invention.

BEST MODE FOR CARRYING OUT THE INVENTION

Figure 7:
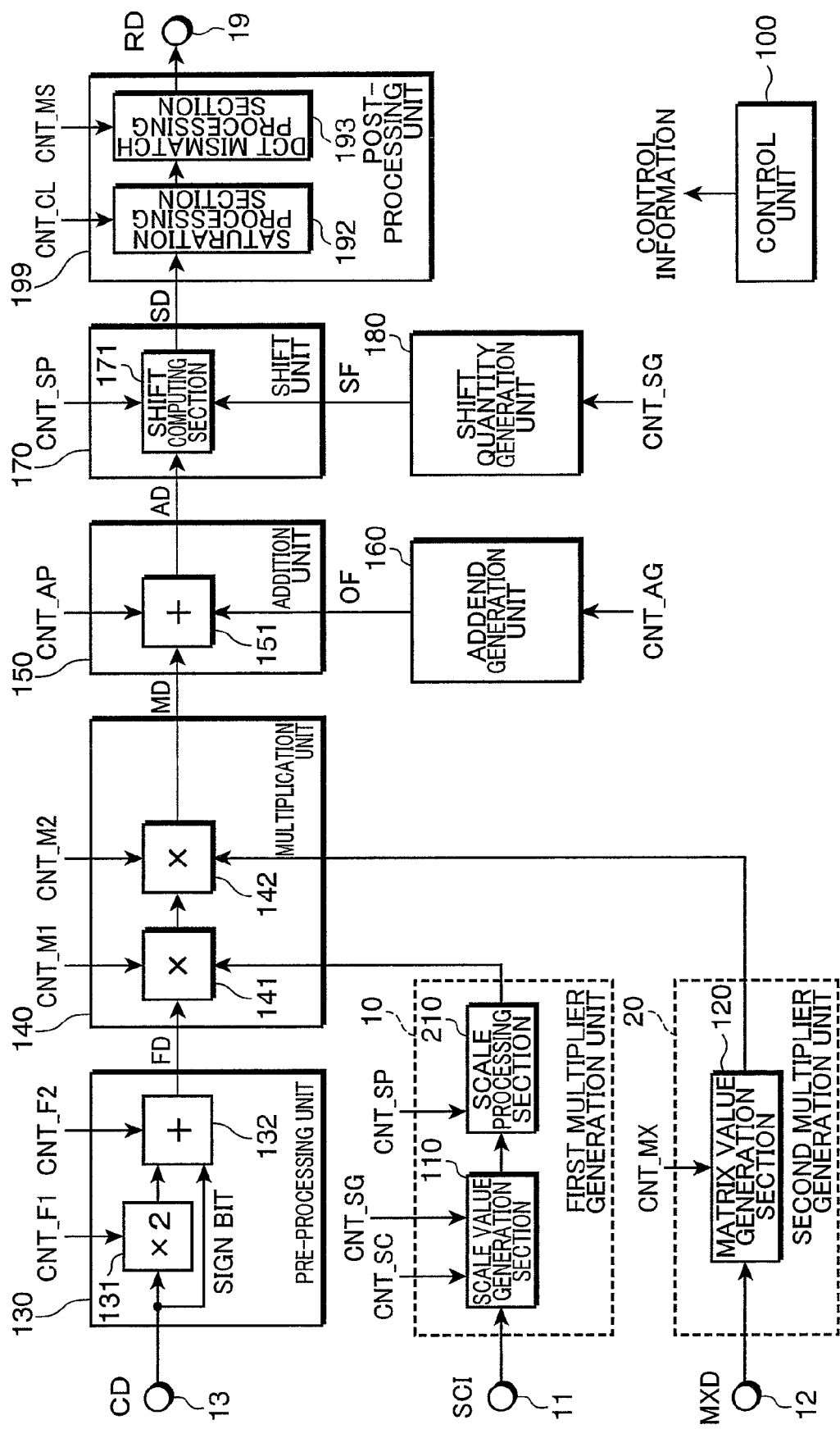
FIG. 7 is a block diagram showing a configuration of an inverse quantization circuit according to Embodiment 2 of the present invention.

Hereinafter, embodiments of the present invention will be described in detail with reference to the accompanying drawings. The following embodiments are examples that embody the present invention and by no means intended to limit the technical scope of the present invention.

Embodiment 1

FIG. 1 is a block diagram showing a configuration of an inverse quantization circuit according to Embodiment 1 of the present invention.

As shown in FIG. 1, the inverse quantization circuit according to Embodiment 1 of the present invention applies various types of operation to quantized coefficient data (hereinafter referred to as "coefficient data" as appropriate) supplied to an input terminal 13, reconstructs the original coefficient value and outputs reconstructed data RD, which is the reconstructed coefficient value, to an output terminal 19. Furthermore, the present inverse quantization circuit realizes an inverse quantization circuit based on systems known as image encoding systems such as a JPEG system targeted at still images, MPEG-1 system, MPEG-2 system, MPEG-4 system, H.263 system and H.264 system, which is also referred to as an MPEG-4AVC system or the like, targeted at moving images. The present inverse quantization circuit has the configuration applicable not only to these encoding systems but also to encoding systems which will be proposed in the future.

In FIG. 1, in the present inverse quantization circuit, coefficient data CD is supplied to the input terminal 13. The coefficient data CD is data resulting from quantization of a coefficient value per frequency obtained, for example, by orthogonally transforming image data based on an image encoding system. The present inverse quantization circuit reconstructs a coefficient value of each frequency component obtained, for example, through discrete cosine transform (DCT: Discrete Cosine Transform, hereinafter referred to as "DCT") in block units of image data by selectively applying operation to such coefficient data CD according to various encoding systems and encoding types of the encoding system.

The inverse quantization circuit shown in FIG. 1 is provided with operation units for performing various types of operation for inverse quantization on the coefficient data CD. The inverse quantization circuit is provided with a multiplication unit 140, an addition unit 150, a shift unit 170 and a post-processing unit 190 as the operation units.

The multiplication unit 140 performs inverse quantization on the coefficient data CD based on a quantization scale and also performs inverse quantization based on a quantization matrix on the coefficient data CD. The addition unit 150 adds a predetermined addend to the coefficient data CD. The shift unit 170 performs bit shift operation of shifting the coefficient data CD by a predetermined number of bits (shift quantity). The post-processing unit 190 performs saturation processing and DCT mismatch control processing on the coefficient data CD.

Furthermore, the inverse quantization circuit is also provided with a first multiplier generation unit 10, a second multiplier generation unit 20, an addend generation unit 160 and a shift quantity generation unit 180. The first multiplier generation unit 10 generates a first multiplier M1 for the multiplication unit 140 to perform inverse quantization based on a quantization scale. The second multiplier generation unit 20 generates a second multiplier M2 for the multiplication unit 140 to perform inverse quantization based on a quantization matrix. The addend generation unit 160 generates a predetermined addend OF to be supplied to the addition unit 150. The shift quantity generation unit 180 generates a shift quantity data SF to be supplied to the shift unit 170.

Furthermore, the inverse quantization circuit is provided with a control unit 100. The control unit 100 outputs control information for instructing the multiplication unit 140, addition unit 150, shift unit 170 and post-processing unit 190 as to whether or not to execute their respective operations.

The each of the operation units in the inverse quantization circuit according to Embodiment 1 of the present invention can, according to an instruction, select contents of operation for inverse quantization and whether or not to include the contents in the operation for inverse quantization. Specifically, when instructed to include the operation of the operation unit in the inverse quantization processing, each operation unit outputs a data value resulting from executing the operation of the operation unit, or when instructed not to include the operation of the operation unit in the inverse quantization processing, each operation unit outputs a data value without executing the operation of the operation unit. In this way, each operation unit selectively switches between data subjected to operation and data not subjected to operation, and outputs the data. Furthermore, the operation unit can also select contents of operation such as a shift quantity in the case of shift operation whereby bits are shifted.

Furthermore, the inverse quantization circuit according to Embodiment 1 of the present invention also allows the multiplier generation unit 10, multiplier generation unit 20, addend generation unit 160 and shift quantity generation unit 180 to select a value to be generated or a way of generating data respectively. Specifically, the control unit 100 outputs control information for instructing a value to be generated or a way of generating data to the multiplier generation unit 10, multiplier generation unit 20, addend generation unit 160 and shift quantity generation unit 180.

Here, the quantized coefficient data inputted to the inverse quantization circuit will be described. An encoded stream including encoded data is supplied to a variable length decoding unit (not shown). The variable length decoding unit reconstructs a quantized coefficient value and extracted information, which will be described later, or the like from the encoded data included in the encoded stream supplied. Specifically, of the encoded data supplied, for example, the quantized coefficient value is generally made up of run level encoded data. Therefore, the variable length decoding unit first reconstructs run data, which is the number of zero quantized coefficient values, and level data, which is a non-zero quantized coefficient value.

Next, the variable length decoding unit reconstructs a one-dimensional quantized coefficient sequence from the reconstructed run data and level data according to the sequence of a scan pattern in encoding. The variable length decoding unit sequentially supplies the quantized coefficient values reconstructed in this way to an encoding-information extracting unit (not shown) as the quantized coefficient data. Likewise, the variable length decoding unit also reconstructs extracted information other than the quantized coefficient values and supplies the extracted information to the encoding-information extracting unit.

Next, the encoding-information extracting unit extracts information on the encoded data for performing inverse quantization processing from the data reconstructed by the variable length decoding unit as extracted information. The encoding-information extracting unit extracts encoding type information and macro block type information or the like as the information on the type of the encoded data as such extracted information.

The encoding type information is information indicating the encoding system used to generate encoded data. Picture type information is information indicating to which data the currently supplied encoded data corresponds; data generated by intra-picture encoding called "I picture," inter-picture forward prediction encoding called "P picture" or data generated by inter-picture bidirectional prediction encoding called "B picture" based on, for example, an MPEG-2 system. The P picture or B picture may include intra macro blocks in a picture and such information is separately extracted as macro block type information. The present embodiment uses the picture type information and macro block type information as information to identify whether the block currently being processed is "intra" which is intra-picture encoding or "inter" which is inter-picture encoding or "non-intra." The encoding-information extracting unit supplies quantized coefficient data to the input terminal 13 and also reports the extracted information to the control unit 100. The control unit 100 identifies the type of the encoding system of the coefficient data inputted based on the encoding type information and macro block type information and outputs control information operable for the type of encoding system.

The inverse quantization circuit according to Embodiment 1 of the present invention has such a basic configuration and realizes a versatile inverse quantization circuit operable for various types of image encoding system by a single circuit by selectively switching whether or not to perform operation in each operation unit or processing contents according to the various types of encoding system. Particularly, the inverse quantization circuit according to Embodiment 1 of the present invention has a versatility-oriented configuration and adopts a configuration operable for not only various existing encoding systems but also encoding systems which will be implemented in the future. Hereinafter, a detailed configuration of the inverse quantization circuit according to Embodiment 1 of the present invention will be described.

As shown in FIG. 1, the coefficient data CD supplied to the input terminal 13 of the present inverse quantization circuit is supplied to the multiplication unit 140 first. The multiplication unit 140 includes a first multiplier 141 (hereinafter simply referred to as a "multiplier 141" as appropriate) and a second multiplier 142 (hereinafter simply referred to as a "multiplier 142" as appropriate). The multiplier 141 multiplies the coefficient data CD supplied to the input terminal 13 by the first multiplier M1 (hereinafter simply referred to as a "multiplier M1" as appropriate) supplied from the first multiplier generation unit 10 (hereinafter simply referred to as a "multiplier generation unit 10" as appropriate). The multiplier 142 multiplies the data outputted from the multiplier 141 by the second multiplier M2 (hereinafter simply referred to as a "multiplier M2" as appropriate) supplied from the second multiplier generation unit 20 (hereinafter simply referred to as a "multiplier generation unit 20" as appropriate).

Furthermore, in the multiplication unit 140, the multiplier 141 is configured so as to be able to perform switching control as to whether or not to perform operation of multiplying the multiplier M1 according to control information CNT_M1 from the control unit 100. On the other hand, the multiplier 142 is configured so as to be able to perform switching control as to whether or not to perform operation of multiplying the multiplier M2 according to control information CNT_M2 from the control unit 100. In such a configuration of the multiplication unit 140, when, for example, instructed from the control unit 100 not to perform operation using control information CNT_M1 and control information CNT_M2, the multiplication unit 140 outputs the coefficient data CD supplied to the input terminal 13 as output data MD of the multiplication unit 140. On the contrary, when, for example, instructed from the control unit 100 to perform operation using control information CNT_M1 and control information CNT_M2, the multiplication unit 140 outputs data having a value resulting from multiplication of the coefficient data CD by the multiplier M1 and multiplier M2 as the output data MD.

As described above, the multiplication unit 140 has the operation function of multiplying the coefficient data CD by the multiplier M1 and multiplier M2 and is also configured so as to be able to select whether or not to include these operations in operation targets and selectively switch between data subjected to operation and data not subjected to operation through the processing of such multiplication operations and output the selected data.

Instead of the configuration whereby as shown in FIG. 1, the coefficient data CD is multiplied by the multiplier M1 first and then multiplied by the multiplier M2, the multiplication unit 140 may also be configured so that the coefficient data CD is multiplied by the multiplier M2 first and then multiplied by the multiplier M1. Furthermore, the multiplication unit 140 may also be configured so as to multiply the coefficient data CD by the product of the multiplier M1 and the multiplier M2.

In this way, the multiplication unit 140 has the selection function of selecting one of the value resulting from multiplication of the coefficient data CD by the multiplier M1, the value resulting from multiplication of the coefficient data CD by the multiplier M2 and the value resulting from multiplication of the coefficient data CD by the product of the multiplier M1 and the multiplier M2 using control information CNT_M1 and control information CNT_M2 and supplies the selected value to the addition unit 150 as the output data MD. Furthermore, such a selection function of the multiplication unit 140 selects each value according to the type of the coefficient data CD.

Next, the multiplier generation unit 10 generates the multiplier M1 to be supplied to the above described multiplication unit 140. The multiplier generation unit 10 mainly generates a quantization scale value (hereinafter referred to as a "scale value") indicating a quantization width defined for each block such as macro block called a "quantization scale" in the image encoding system. To generate such a scale value, the multiplier generation unit 10 is provided with a scale value generation section 110 for generating a scale value as shown in FIG. 1. Furthermore, the multiplier generation unit 10 has a scale processing section 210 that outputs the multiplier M1 by selectively applying operation for each encoding system and the encoding type in the encoding system to the scale value generated by the scale value generation section 110.

The inverse quantization circuit according to the present embodiment is provided with an input terminal 11 that supplies a quantization scale index (hereinafter referred to as a "scale index" as appropriate) SCI to such multiplier generation unit 10. The scale index SCI supplied to the input terminal 11 is supplied to the scale value generation section 110 of the multiplier generation unit 10. The scale index SCI is code associated with an actual scale value made up of, for example, a series of integer values. Specifically, the scale value of, for example, the MPEG-2 system is defined as a characteristic value that becomes 31 non-linear scales that increase as 1, 2, ..., 104, 112. When such a scale value is selected, "1" is selected as the scale value when, for example, the scale index SCI is 0 and "2" is selected as the scale value when the scale index SCI is 1, "104" is selected as the scale value when the scale index SCI is 30 and "112" is selected as the scale value when the scale index SCI is 31.

The scale value generation section 110 has a conversion function that converts such a scale index SCI to an actual scale value. The conversion function is made up of, for example, a conversion table or conversion operator and is configured so as to be able to switch the type of conversion according to control information CNT_SC from the control unit 100. Furthermore, the scale processing section 210 of the multiplier generation unit 10 selects one of the scale value generated in the scale value generation section 110 and a value obtained through operation by the scale processing section 210 according to an instruction of control information CNT_SP from the control unit 100 and outputs the selected value as the multiplier M1.

In such a configuration, the multiplier generation unit 10 outputs the above described scale value as the multiplier M1 in the case of, for example, MPEG-1 system, MPEG-2 system, MPEG-4 system and H.263 system according to the control information CNT_SC and CNT_SP. Furthermore, in the case of, for example, JPEG system, the multiplier generation unit 10 outputs a fixed value as the multiplier M1. Furthermore, in the case of the H.264 system, the multiplier generation unit 10 outputs the value of a normalized coefficient, which is a scale value normalized based on the H.264 system, as the multiplier M1. As described above, the multiplier generation unit 10 generates the multiplier M1 for applying operation to the coefficient data CD.

Next, the multiplier generation unit 20 generates the multiplier M2 to be supplied to the above described multiplication unit 140. The multiplier generation unit 20 mainly generates a quantization matrix value called a "quantization matrix" in which a quantization width is set for each frequency in the image encoding system (hereinafter referred to as a "matrix value" as appropriate). Therefore, as shown in FIG. 1, the multiplier generation unit 20 has a matrix value generation section 120 for generating such a matrix value.

The inverse quantization circuit according to the present embodiment is provided with an input terminal 12 to which quantization matrix data (hereinafter referred to as "matrix data" as appropriate) MXD is supplied. The matrix data MXD supplied to the input terminal 12 is supplied to the matrix value generation section 120. The matrix value generation section 120 is made up of, for example, a storage section such as a memory that is rewritable according to such matrix data MXD and outputs a matrix value for each frequency. The storage section in the matrix value generation section 120 is made up of, for example, a table which sequentially stores matrix values and configured so as to be able to switch the type of matrix value according to control information CNT_MX from the control unit 100.

In the case of, for example, JPEG system, MPEG-1 system, MPEG-2 system, MPEG-4 system and H.264 system, the matrix value generation section 120 in such a configuration outputs the above described matrix value as the multiplier M2 according to the control information CNT_MX. On the other hand, in the case of, for example, H.263 system, the matrix value generation section 120 outputs a fixed value as the multiplier M2. As described above, the multiplier generation unit 20 generates the multiplier M2 for applying operation to the coefficient data CD.

Next, the output data MD outputted from the multiplication unit 140 is supplied to the addition unit 150 as shown in FIG. 1. The addition unit 150 is provided with an adder 151 that adds an addend OF supplied from the addend generation unit 160 to the output data MD from the multiplication unit 140.

Furthermore, the adder 151 of the addition unit 150 is configured so as to be able to perform switching control as to whether or not to perform operation of adding the addend OF according to control information CNT_AP from the control unit 100. In such a configuration of the addition unit 150, when, for example, instructed not to perform addition operation using the control information CNT_AP, the addition unit 150 outputs the output data MD from the multiplication unit 140 as output data AD of the addition unit 150. On the other hand, conversely, when, for example, instructed to perform addition operation using the control information CNT_AP, the addition unit 150 outputs data having a value resulting from addition of the addend OF to the output data MD from the multiplication unit 140 as the output data AD. The output data AD is supplied to the rounding unit 155, which will be described later.

As described above, the addition unit 150 has the operation function of adding the addend OF to the coefficient data CD and is configured so as to be able to select whether or not to include this addition operation in operation targets and selectively switch between data subjected to operation and data not subjected to operation and output the data in such addition operation.

In this way, the addition unit 150 is provided with the selection function capable of selecting one value of the output data MD supplied from the multiplication unit 140 and the value resulting from addition of the addend OF to the output data MD supplied from the multiplication unit 140 using the control information CNT_AP and outputs the selected value to the rounding unit 155 as the output data AD.

Next, the addend generation unit 160 generates the addend OF to be supplied to the above described addition unit 150. The addend generation unit 160 selectively outputs the addend OF for each encoding system according to an instruction of control information CNT_OF from the control unit 100 and supplies the addend OF to the addition unit 150. As described above, the addend generation unit 160 generates the addend OF for applying operation to the coefficient data CD.

The addition unit 150 and addend generation unit 160 are provided so as to correspond to the quantization system including a dead zone defined by the MPEG-1 system, MPEG-2 system, MPEG-4 system and H.263 system or the like. For example, in the case of the MPEG-2 system, it is defined that dead zone processing is not performed on intra-picture encoded data as the encoding type, while dead zone processing is performed on inter-picture encoded data. Such a dead zone in the quantization system means a range in which the value of the coefficient data CD is rounded to 0 and the amount of compression is controlled by specifying the range of this dead zone as a predetermined range in the above described encoding system. When such a dead zone is provided in quantization, a high degree of compression is usually intended by widening the range in which the value of the coefficient data CD becomes 0 compared to ranges in which the value of the coefficient data CD becomes other values.

Therefore, when, for example, inverse quantization processing is performed on the MPEG-2 coefficient data CD, the addition unit 150 and addend generation unit 160 are controlled so as not to perform inverse quantization processing operable for quantization including a dead zone when intra-picture encoded coefficient data CD is supplied to the input terminal 13, or so as to perform inverse quantization processing operable for quantization including a dead zone when inter-picture encoded coefficient data CD is supplied. In this way, it is possible to perform processing operable for quantization including a dead zone defined in the MPEG-2 system.

According to the present embodiment, the addend generation unit 160 generates a value for the range of the dead zone as the addend OF and the addition unit 150 adds the addend OF to the output data MD from the multiplication unit 140 and thereby performs processing of inverse quantization in association with quantization including such a dead zone. Furthermore, whether or not to perform processing on the dead zone defined in the respective encoding systems is switched using control information CNT_AP in the addition unit 150 and control information CNT_OF in the addend generation unit 160.

Next, the output data AD outputted from the addition unit 150 is supplied to the rounding unit 155 as shown in FIG. 1.

The rounding unit 155 is provided with a rounding computing section 156 that performs rounding processing on the output data AD from the addition unit 150. Furthermore, the rounding computing section 156 of the rounding unit 155 is configured so as to be able to perform switching control as to whether or not to perform rounding operation according to the instruction contents of control information CNT_RN from the control unit 100.

When instructed to perform rounding operation based on the instruction contents of the control information CNT_RN from the control unit 100, the rounding computing section 156 adds a rounding value in accordance with the contents of shift operation by the shift unit 170, which will be described later, and the shift quantity thereof and thereby realizes division processing with rounding in combination with the shift unit 170. Specifically, when, for example, the shift unit 170 in the following stage performs a right shift, the rounding value in accordance with the shift quantity is added by the rounding computing section 156 and division processing is thereby executed by the rounding unit 155 and shift unit 170.

In such a configuration of the rounding unit 155, when, for example, instructed not to perform rounding operation from the control unit 100 using the control information CNT_RN, the rounding unit 155 outputs the output data AD from the addition unit 150 as output data RN of the rounding unit 155. Furthermore, when, for example, instructed to perform rounding operation using the control information CNT_RN, the rounding unit 155 outputs data having a value resulting from performing rounding processing on the output data AD from the addition unit 150 as the output data RN. The output data RN is supplied to the shift unit 170.

Next, the output data RN outputted from the rounding unit 155 is supplied to the shift unit 170 as shown in FIG. 1. The shift unit 170 is provided with a shift computing section 171 that performs a bit shift of the output data RN in accordance with shift quantity data SF supplied from the shift quantity generation unit 180 on the output data RN from the rounding unit 155.

Furthermore, in the shift unit 170, the shift computing section 171 is configured so as to be able to perform switching control as to whether or not to perform shift operation according to the instruction contents of the control information CNT_SP from the control unit 100. In such a configuration of the shift unit 170, when, for example, instructed not to perform shift operation from the control unit 100 using control information CNT_SP, the shift unit 170 outputs the output data RN from the rounding unit 155 as output data SD of the shift unit 170. Furthermore, conversely, when, for example, instructed to perform shift operation from the control unit 100 using the control information CNT_SP, the shift unit 170 outputs data having a value resulting from performing a bit shift in accordance with the shift quantity data SF with respect to the output data RN from the rounding unit 155 as the output data SD. The output data SD is supplied to the post-processing unit 190.

Furthermore, the shift computing section 171 is configured so as to allow switching control of the shift operation contents by the shift computing section 171 according to the instruction contents of the control information CNT_SP. Specifically, the shift computing section 171 can also control the shift direction of shift operation and shift quantity as the shift operation contents according to the control information CNT_SP.

As described above, the shift unit 170 has the shift operation function of performing bit shift operation to the output data RN outputted from the rounding unit 155 according to shift quantity data SF, can further select whether or not to include the shift operation contents and this shift operation in operation targets and is configured so as to selectively switch between data subjected to operation and data not subjected to operation through such shift operation and output the data.

In this way, the shift unit 170 has a selection function capable of selecting one of the value of the output data RN supplied from the rounding unit 155 and the value obtained through the bit shift operation using the control information CNT_SP and outputs the selected value as the output data SD.

Next, the shift quantity generation unit 180 generates the shift quantity data SF indicating a shift quantity to be supplied to the above described shift unit 170. Such shift quantity data SF is used for scale matching defined in each encoding system. The shift quantity generation unit 180 selectively outputs the shift quantity data SF for such an encoding system according to the instruction of control information CNT_SF from the control unit 100 and supplies the shift quantity data SF to the shift unit 170. As described above, the shift quantity generation unit 180 generates the shift quantity data SF for applying shift operation to the coefficient data.

The rounding unit 155 performs rounding processing by adding a value in accordance with the shift quantity data SF generated by the shift quantity generation unit 180 to the output data AD from the addition unit 150 only when the bit shift operation in the shift unit 170 is a rightward shift.

Next, the output data SD outputted from the shift unit 170 is supplied to the post-processing unit 190 as shown in FIG. 1. The post-processing unit 190 includes DCT mismatch processing sections 191 and 193 that perform DCT mismatch control processing on the output data SD from the shift unit 170 and a saturation processing section 192 that performs saturation processing so as to clip a value equal to or greater than a predetermined value or a value equal to or less than the predetermined value to the predetermined value.

Furthermore, the saturation processing section 192 is configured so as to be able to perform switching control as to whether or not to perform saturation processing according to control information CNT_CL from the control unit 100. The DCT mismatch processing section 191 is configured so as to be able to perform switching control as to whether or not to perform DCT mismatch control processing according to control information CNT_MS1 from the control unit 100. Furthermore, the DCT mismatch processing section 193 is configured so as to be able to perform switching control as to whether or not to perform DCT mismatch control processing according to control information CNT_MS2 from the control unit 100.

Such saturation processing and DCT mismatch control processing are defined in the MPEG-1 system and MPEG-2 system or the like. Specifically, encoding and decoding in the MPEG-1 system and MPEG-2 system each require inverse DCT processing, but depending on the operation system of inverse DCT processing by the encoder and decoder, their respective decoded images may be different from each other and their errors may be accumulated. Therefore, some encoding systems define DCT mismatch control processing for the purpose of correcting such malfunctions.

Furthermore, as a specific example of such DCT mismatch control processing, in the case of the MPEG-1 system, for example, processing is performed such that all coefficient values to be reconstructed are converted to odd numbers in the direction of approximating to 0. Furthermore, in the case of the MPEG-2 system, for example, all coefficient values are added up and when the sum thereof is an even number, processing is carried out such that the highest frequency component, that is, the value of the coefficient [7] [7] component is changed.

Furthermore, in the saturation processing, more specifically, the saturation processing section 192 performs saturation processing so as to clip the coefficient value to a value of "−2048" when the coefficient value supplied to the saturation processing section 192 is equal to or less than "−2048," or clip the coefficient value to a value of "2047" when the coefficient value supplied to the saturation processing section 192 is equal to or greater than "2047."

Furthermore, the MPEG-1 system or the like is defined to perform saturation processing next to DCT mismatch control processing and the MPEG-2 system is defined to perform DCT mismatch control processing next to saturation processing.

For this reason, when performing inverse quantization processing on the coefficient data CD in the MPEG-1 system, the control unit 100 in the present inverse quantization circuit instructs the DCT mismatch processing section 191 to perform DCT mismatch control processing according to the control information CNT_MS1, instructs the saturation processing section 192 to perform saturation processing according to the control information CNT_CL and instructs the DCT mismatch processing section 193 not to perform DCT mismatch control processing according to control information CNT_MS2. This causes saturation processing to be executed next to DCT mismatch control processing as defined in the MPEG-1 system.

Furthermore, when inverse quantization processing is performed on the coefficient data CD in the MPEG-2 system, the control unit 100 instructs the DCT mismatch processing section 191 not to perform DCT mismatch control processing according to the control information CNT_MS1, instructs the saturation processing section 192 to perform saturation processing according to the control information CNT_CL and instructs the DCT mismatch processing section 193 to perform DCT mismatch control processing according to the control information CNT_MS2. This causes DCT mismatch control processing to be executed next to saturation processing defined in the MPEG-2 system.

In this way, the provision of the DCT mismatch processing section 191 and DCT mismatch processing section 193 makes it possible to select to perform DCT mismatch control processing before or after the saturation processing section 192. Furthermore, the DCT mismatch processing section 191 and DCT mismatch processing section 193 may also be configured so as to be able to set conditions under which DCT mismatch control processing is performed. Furthermore, the configuration may also be adapted so as to make it possible to control whether or not to perform operation and contents of operation to the DCT mismatch processing section 191 and DCT mismatch processing section 193 depending on the type of coefficient data CD.

As described so far, the operation is performed according to control information and depending on each encoding system. Reconstructed data RD having a reconstructed coefficient value is outputted from the post-processing unit 190 to the output terminal 19.

As described above, an assumption is made in the following explanations that operation in each processing unit and a value and a way of generating data in each generation unit are selectable, but the present invention is not particularly limited to this. For example, the present invention may be configured such that at least one operation unit of the multiplication unit 140, addition unit 150 and shift unit 170 is allowed to select whether or not operation is included in operation targets depending on the type of the corresponding encoding system or configured such that at least one generation unit of the first multiplier generation unit 10, second multiplier generation unit 20, addend generation unit 160 and shift quantity generation unit 180 is allowed to select a value to be generated or a way of generating data.

Next, the inverse quantization expression defined in each encoding system will be described.

FIG. 2 to FIG. 4 show inverse quantization expressions defined in the respective encoding systems. FIG. 2 shows inverse quantization expressions in a JPEG system which is widely used as a system for compressing/encoding a still image, MPEG-1 system and MPEG-2 system which are widely used as a system for compressing/encoding a moving image. FIG. 3 shows inverse quantization expressions under an H.263 system which is defined by the ITU-T (International Telecommunication Union-Telecommunication Standardization Sector) Recommendations, which is an international standardization organization on telecommunications and inverse quantization expression in an MPEG-4 system which is widely used as a system for compressing/encoding a moving image. Furthermore, FIG. 4 shows inverse quantization expressions under an H.264 system defined in the ITU-T Recommendations. Furthermore, FIG. 2 to FIG. 4 show classification items of different inverse quantizations in accordance with the encoding types of coefficient data, and their respective coefficient data, that is, those of "intra" denoting intra-picture encoding, "non-intra" denoting inter-picture encoding, "DC" denoting a DC component, "AC" denoting an AC component, "luma" denoting luminance data, and "chroma" denoting chrominance data.

In the respective encoding systems, in the case of the JPEG system, as shown in FIG. 2, inverse quantization is performed by multiplying coefficient data shown by "$Sq_{vu}$" by a matrix value shown by "$Q_{vu}$" and coefficient data $R_{vu}$ reconstructed through inverse quantization is obtained.

In the case of the MPEG-1 system, as shown in FIG. 2, inverse quantization is performed on the coefficient data of the DC component in intra-picture encoding by simply multiplying coefficient data dct_zz[0] eightfold and coefficient data dct_recon[0][0] reconstructed through inverse quantization is obtained. Furthermore, inverse quantization is performed on the coefficient data of the AC component in intra-picture encoding by multiplying coefficient data dct_zz[i] by a value doubling scale value quantizer_scale, matrix value intra_quant[m][n] and 1/16 as scale matching. Reconstructed through inverse quantization in this way, coefficient data dct_recon[m][n] is obtained.

Furthermore, inverse quantization is performed on coefficient data in inter-picture encoding, by doubling coefficient data dct_zz[i], adding the sign of the coefficient data Sign(dct_zz[i]) and multiplying the data obtained in this way by scale value quantizer_scale, matrix value non-intra_quant[m][n] and 1/16 as scale matching. Reconstructed through inverse quantization in this way, coefficient data dct_recon[m][n] is obtained.

Furthermore, in saturation processing and DCT mismatch control processing in the MPEG-1 system, the sign, that is, Sign(dct_zz[i]) is subtracted from coefficient data other than intraDC when the reconstructed coefficient value is an even number and converted to an odd number in the direction of approximating to 0. Furthermore, saturation processing is performed after DCT mismatch control processing is performed.

Next, inverse quantization in the MPEG-2 system will be described. In the case of the MPEG-2 system, in the operation expression of inverse quantization defined as shown in FIG. 2, for example, "QF[v][u]" denotes coefficient data of inter-picture encoding, "F"[v][u]" denotes coefficient data reconstructed through inverse quantization, "W[w][v][u]" denotes a matrix value in inter-picture encoding and "quantizer_scale" denotes a scale value. Furthermore, "Sign( )" denotes the sign of an argument, which indicates a function that returns 1 when the sign of the argument is positive, returns −1 when the sign is negative and returns 0 when the sign is 0. Specifically, inverse quantization is performed on inter-picture encoded coefficient data QF[v][u] in the MPEG-2 system by doubling the coefficient data QF[v][u], adding a sign k of the coefficient data according to the above described definition of function shown by Sign(QF[v][u]) and multiplying the data obtained in this way by a matrix value W[w][v][u], scale value quantizer_scale and 1/32 as scale matching. Reconstructed through inverse quantization in this way, reconstructed data F'''[v][u] is obtained.

Inverse quantization is performed on the coefficient data QF[v][u] of the AC component in intra-picture encoding in the MPEG-2 system by multiplying a value doubling the coefficient data QF[v][u] by the matrix value W[w][v][u], scale value quantizer_scale and 1/32 as scale matching. Reconstructed through inverse quantization in this way, reconstructed data F'''[v][u] is obtained.

Furthermore, inverse quantization is performed on the coefficient data of the DC component in intra-picture encoding in the MPEG-2 system by multiplying coefficient data QF[0][0] by scale value intra_dc_mult and reconstructed data F'''[0][0] is thereby obtained.

Furthermore, in the saturation processing and DCT mismatch control processing in the MPEG-2 system, when the sum of all reconstructed coefficient values is an even number, the highest frequency component of the reconstructed coefficient values, that is, the least significant bit of the value of the coefficient [7] [7] component is inverted. Furthermore, DCT mismatch control processing is performed after performing saturation processing.

Furthermore, Sign(dct_zz[i]) in the MPEG-1 system, Sign (QF[v][u]) in the MPEG-2 system, and Sign(QF[v][u]) in the MPEG-4 system which will be described next express the functions of the above described dead zone in the respective expressions. Specifically, dead zone processing in inverse quantization can be performed, for example, on the coefficient data QF[v][u] in inter-picture encoding in the MPEG-2 system by adding the sign value Sign(QF[v] [u]) to a value doubling the coefficient data QF[v][u].

Next, inverse quantization in the MPEG-4 system shown in FIG. 3 will be described. In the case of the MPEG-4 system, for example, the inverse quantization operation expression defined as shown in FIG. 3 is used for the inter-picture encoding, and coefficient data QF[v][u] of the AC component in intra-picture encoding in the method 1. "F"[v][u]" in the operation expression denotes the coefficient data reconstructed through inverse quantization, "W[w][v][u]" denotes a matrix value in inter-picture encoding and "quantizer_scale" denotes a scale value. Furthermore, "k" indicates whether or not to perform dead zone processing depending on an intra-picture encoding block or non-intra-picture encoding (inter-picture encoding) block, and coefficient data of the non-intra-picture encoding block is subjected to dead zone processing shown in Sign(QF[v][u]) as in the case of inter-picture encoding in the MPEG-2 system.

Specifically, inverse quantization is performed on, for example, coefficient data QF[v][u] of inter-picture encoding in the method 1 of the MPEG-4 system by doubling the coefficient data QF[v][u] when the coefficient data QF[v][u] is not 0, adding the sign of the coefficient data Sign(QF[v][u]) and multiplying the data obtained in this way by a matrix value W[w][v][u], scale value quantizer_scale and 1/16 as scale matching. Reconstructed through inverse quantization in this way, coefficient data F"[v][u] is obtained.

Furthermore, as for the saturation processing and DCT mismatch control processing in the MPEG-4 system, in the case where the sum of all reconstructed coefficient values in the method 1 is an even number, the highest frequency component out of the reconstructed coefficient values, that is, the least significant bit of the value of the coefficient [7][7] component is inverted. Furthermore, in the case of the method 2, a numerical value "1" is subtracted from the absolute value of the coefficient data other than intraDC, that is, |F" [v][u]| in the case where the reconstructed coefficient value is an even number, and converted to an odd number in the direction of approximating to 0 in this way. However, when the coefficient data is 0, "0" is outputted. Furthermore, saturation processing is performed after carrying out DCT mismatch control processing.

Next, inverse quantization in the H.263 system shown in FIG. 3 will be described. In the case of the H.263 system, for example, the inverse quantization operation expression defined as shown in FIG. 3 is used for inter-picture encoding, and coefficient data LEVEL of the AC component in intra-picture encoding. In the operation expression, "REC" denotes coefficient data reconstructed through inverse quantization and "QUANT" denotes a scale value. Specifically, inverse quantization is performed on the coefficient data LEVEL of inter-picture encoding, for example, in the H.263 system, by doubling the absolute value of the coefficient data LEVEL when the scale value QUANT is an even number, adding "1" thereto, multiplying the data obtained in this way by the scale value QUANT and further multiplying the data obtained in this way by the sign of coefficient data LEVEL Sign (LEVEL).

Furthermore, in the saturation processing and DCT mismatch control processing in the H.263 system, a value "1" is subtracted from the absolute value of the coefficient data other than intraDC, that is, |REC|, when the reconstructed coefficient value is an even number and converted to an odd number in the direction of approximating to 0. However, when the coefficient data is 0, "0" is outputted. Furthermore, saturation processing is executed after DCT mismatch control processing is performed.

Next, inverse quantization in the H.264 system shown in FIG. 4 will be described. The H.264 system is characterized by not adopting the above described dead zone. Furthermore, the H.264 system adopts such a technique that does not directly encode the quantization scale value, encodes a quantization parameter qP and derives a quantization scale value from the quantization parameter qP.

Specifically, the H.264 system introduces such a mechanism that the quantization parameter qP is proportional to the logarithm of the quantization scale such that when, for example, the quantization parameter qP is incremented by 6, the quantization scale value doubles. Therefore, assuming that the remainder resulting from dividing qP by 6 is (qP %6) and the quotient resulting from dividing qP by 6 is (qP/6), the quantization scale value is a value resulting from multiplication of the quantization scale value of (qP %6) by the value of the (qP/6)-th power of 2.

Furthermore, the H.264 system uses a conversion table for conversion between such a quantization parameter qP and quantization scale, also uses the conversion table for operation for inverse quantization and normalization such as 8/5 times necessary for orthogonal conversion, shifts the (qP %6) quantization scale by (qP/6) bits to the left, and can thereby calculate a quantization scale corresponding to an arbitrary qP. In FIG. 4, symbol "<<" denotes a left shift and symbol ">>" denotes a right shift.

Furthermore, in the DC component DC of luminance luma on a 16×16 block of intra-picture encoding Intra shown in FIG. 4, if a quantization parameter QP'Y is less than the value "36," a right shift is carried out according to the expression in FIG. 4 and a rounding value ($2^{5-QP'Y/6}$) in accordance with the shift quantity is added by the rounding computing section 156 of the rounding unit 155. In this way, division processing is performed by the rounding unit 155 and shift unit 170.

The inverse quantization circuit of the present embodiment expands these expressions for the basic operation expressions for inverse quantization shown in FIG. 2, for example, and adopts a circuit configuration based on the expanded expressions. In the case of inverse quantization on the coefficient data QF[v][u] of inter-picture encoding in the MPEG-2 system, for example, the inverse quantization circuit of the present embodiment is configured to perform dead zone processing by adding a value which becomes (Sign (QF[v][u])× W[w][v][u]×quantizer_scale) to the value resulting from multiplication of coefficient data QF[v][u] by (2×W[w][v][u]×quantizer_scale).

As described so far, though further detailed explanations of the inverse quantization expressions in the respective encoding systems will be omitted, the inverse quantization circuit of the present embodiment performs inverse quantization by carrying out operations such as multiplying the supplied coefficient data by a predetermined multiplier such as a scale value or matrix value or adding an addend as in the case of the above described encoding systems based on the operation expressions as shown in FIG. 2 to FIG. 4 in the respective encoding systems.

FIG. 5 shows a list of operations for respective inverse quantization expressions in the inverse quantization circuit according to Embodiment 1 of the present invention. FIG. 5 puts together the respective inverse quantization expressions in FIG. 2 to FIG. 4 so as to be realized through common operations. Particularly, the inverse quantization circuit of the present embodiment is characterized by configuring the respective parts based on operation expressions including the expressions resulting from expanding the respective inverse quantization expressions in FIG. 2 to FIG. 4.

In FIG. 5, "COEFFICIENT" for the operation term CD denotes coefficient data CD for inverse quantization and "MATRIX" for the operation term M2 denotes a matrix value. Furthermore, "2" for the operation term M1 denotes a multiplier 2, "SCALE" denotes a scale value and "NORMALIZATION" denotes a normalized coefficient value defined in the H.264 system. Furthermore, "SIGN" for the operation term Sign is a sign indicating positive/negative of coefficient data and shows operation or the like for a quantization system including a dead zone using the sign of coefficient data.

Furthermore, "MATRIX" for the operation term OF denotes a matrix value and "SCALE" denotes a scale value. "ROUNDING" for the operation term RN denotes a rounding value in the H.264 system. Furthermore, "SHIFT" for the operation term SF denotes shift operation of the shift unit 170 and "POST" denotes processing of the post-processing unit 190. Furthermore, numbers such as "0", "1" and "8" in the respective operation terms denote constants indicated by the values. Furthermore, parts indicated by "SHIFT" denote locations where shift operation is performed and parts indicated by arrows indicate locations where shift operation is not executed. Furthermore, parts indicated by "POST" denote locations where processing is performed by the post-processing unit 190 and the parts indicated by arrows denote locations where processing is not performed by the post-processing unit 190.

In this way, the respective inverse quantization expressions in the respective encoding systems in FIG. 2 to FIG. 4 can be expressed by common operations as shown in FIG. 5. Specifically, the configuration of the inverse quantization circuit according to Embodiment 1 of the present invention described in FIG. 1 is a circuit that realizes common operations as shown in FIG. 5, and is adapted to the respective encoding systems by switching execution of each operation according to the above described control information. The inverse quantization circuit according to Embodiment 1 of the present invention suppresses increases of the circuit scale by achieving commonality of operations.

FIG. 6 is a block diagram showing an example of more detailed configuration of the multiplier generation unit 10, multiplier generation unit 20, addend generation unit 160 and shift quantity generation unit 180 in order to realize common operations as shown in FIG. 5.

In FIG. 6, the multiplier generation unit 10 is made up of the scale value generation section 110 and scale processing section 210 as descried above.

In FIG. 6, the scale value generation section 110 is provided with one or a plurality of types of scale table (first scale conversion unit) 111 that convert a supplied scale index SCI, a normalized table (second scale conversion unit) 112 that further converts the value outputted from the scale table 111 and a selector (selection unit) 119 that selects one of the value outputted from the scale table 111 and the value outputted from the normalized table 112. The selector 119 selects one of the value outputted from the scale table 111 and the value outputted from the normalized table 112 according to the instructed contents of control information CNT_SG from the control unit 100 and outputs the selected value to the scale processing section 210. Furthermore, the value outputted from the scale table 111 is outputted to the shift quantity generation unit 180.

In the scale value generation section 110 shown in FIG. 6, the normalized table 112 is a table provided to support the H.264 system in particular. Specifically, when inverse quantization is performed based on the H.264 system, a quantization parameter qP is supplied to the input terminal 11 as the scale index SCI. Furthermore, the quantization parameter qP is converted to a scale value by the scale table 111 and the converted scale value is converted to a coefficient value normalized by the normalized table 112. Furthermore, in the case of the H.264 system, the control unit 100 instructs the selector 119 to select the normalized table 112 through control information CNT_SG and thereby causes the scale value generation section 110 to output a normalized coefficient value, which is a normalized scale value for the H.264 system.

In this way, the scale value generation section 110 includes one or a plurality of types of scale table 111 that convert data such as scale index SCI supplied to the input terminal 11 to a scale value and outputs the value converted by the scale table 111 as a scale value. Furthermore, the scale value generation section 110 includes the normalized table 112 that further converts the value outputted from the scale table 111 and the selector 119 that selects one of the value outputted from the scale table 111 and the value outputted from the normalized table 112 and outputs the selected value as a scale value.

Next, in FIG. 6, the scale processing section 210 is provided with an operation section 211 that applies operation to the scale value generated by the scale value generation section 110 and a selector (selection unit) 219 that selects one value of the scale value, the value obtained through operation on the scale value and a predetermined constant value. The operation section 211 is an operation section provided so as to multiply the scale value by a predetermined constant and to be able to support encoding systems or the like which will be proposed in the future and, for example, multiplies the scale value by a constant value or selectively performs operation such as addition of a constant value to the multiplication result or the like. The selector 219 selects one value of the scale value, value obtained from the operation section 211 and a predetermined constant value according to the instructed contents of control information CNT_SP and outputs the selected value to the multiplication unit 140 as a multiplier M1.

Specifically, the scale processing section 210 selectively outputs the multiplier M1 for the operation term M1 in FIG. 5, mainly related to each encoding system and the scale value for the encoding type thereof.

When, for example, coefficient data in a DC component of intra-picture encoding in the MPEG-1 system is inverse-quantized, the selector 219 selects "8" which is a constant based on control information CNT_SP according to the operation term M1 in FIG. 5 and the constant value "8" selected by the selector 219 is outputted from the scale processing section 210 as the multiplier M1.

Furthermore, when coefficient data of an AC component of intra-picture encoding in the MPEG-1 system is inverse-quantized, the scale value generation section 110 selects the scale value outputted from the scale table 111 according to the operation term M1 in FIG. 5 and outputs the selected scale value to the scale processing section 210. Furthermore, the selector 219 in the scale processing section 210 selects a value doubled and outputted from the operation section 211 according to control information CNT_SP and the scale processing section 210 outputs a value selected by the selector 219, that is, the value doubling the scale value as the multiplier M1.

Furthermore, when the coefficient data is inverse-quantized in the H.264 system, a normalized coefficient value outputted from the normalized table 112 in the scale value generation section 110 is selected according to the operation term M1 in FIG. 5 and this selected normalized coefficient value is outputted to the scale processing section 210. Furthermore, the selector 219 in the scale processing section 210 selects a normalized coefficient value outputted from the scale value generation section 110 according to the control information CNT_SP from the control unit 100 and the scale processing section 210 outputs the value selected by the selector 219, that is, a normalized coefficient value as the multiplier M1.

In this way, the scale processing section 210 outputs one of the scale value, the value obtained through the operation of the operation section 211 and a predetermined constant value as the multiplier M1. Furthermore, the scale processing section 210 includes the operation section 211 that performs operation such as multiplying the scale value from the scale value generation section 110 by a predetermined integer and the selector 219 that selects one value of the scale value, the value obtained by the operation section 211 and a predetermined constant value, and outputs the selected value as the multiplier M1. Furthermore, the selector 219 as the selection function selects each value according to the type of coefficient data CD.

Next, in FIG. 6, the matrix value generation section 120 of the multiplier generation unit 20 includes a matrix table 121 that outputs a matrix value according to supplied matrix data MXD and a selector 129 that selects one value of this matrix value and a predetermined constant value. The selector 129 selects one value of the matrix value and the constant value according to the instructed contents of control information CNT_MX from the control unit 100 and outputs the selected value to the multiplication unit 140 as a multiplier M2.

Specifically, the matrix value generation section 120 selectively outputs the multiplier M2 for the operation term M2 in FIG. 5 and mainly related to the matrix value for each encoding system and the encoding type thereof. When, for example, coefficient data of the DC component of intra-picture encoding in the MPEG-1 system is inverse-quantized, the selector 129 selects "1" which is a constant based on the control information CNT_MX according to the operation term M2 in FIG. 5 and constant value "1" selected by the selector 129 is outputted from the matrix value generation section 120 as the multiplier M2.

Furthermore, when the coefficient data of the AC component in intra-picture encoding in the MPEG-1 system is inverse-quantized, the selector 129 selects the matrix value outputted from the matrix table 121 based on the control information CNT_MX according to the operation term M2 in FIG. 5 and the matrix value generation section 120 outputs the matrix value selected by the selector 129 as the multiplier M2.

In this way, the matrix value generation section 120 outputs one of the matrix value for each frequency and a predetermined constant value as the multiplier M2.

Next, in FIG. 6, the addend generation unit 160 includes a multiplier 161 that multiplies the scale value generated by the scale value generation section 110 and the matrix value generated by the matrix value generation section 120 and a selector 169 that selects one value of the scale value, matrix value, a value obtained from the multiplier 161 by multiplying the scale value by the matrix value and a predetermined constant value. The selector 169 may be configured so as to select any one of the scale value, matrix value, value obtained from the multiplier 161 by multiplying the scale value by the matrix value, and some of the predetermined constant values. The selector 219 selects one value of the scale value, matrix value, value obtained from the multiplier 161 by multiplying the scale value by the matrix value and a predetermined constant value according to the instructed contents of control information CNT_OF from the control unit 100 and outputs the selected value to the addition unit 150 as an addend OF.

Specifically, the addend generation unit 160 selectively outputs the addend OF for the operation term OF in FIG. 5 and related to a dead zone mainly according to each coding system and encoding type thereof. When, for example, coefficient data in the DC component in intra-picture encoding in the MPEG-1 system is inverse-quantized, the selector 169 selects "0" which is a constant based on the control information CNT_OF according to the operation term OF in FIG. 5 and the addend generation unit 160 outputs constant value "0" selected by the selector 169 as the addend OF.

Furthermore, when the coefficient data in inter-picture encoding in the MPEG-1 system is inverse-quantized, the selector 169 selects the value outputted from the multiplier 161 based on the control information CNT_OF from the control unit 100 according to the operation term OF in FIG. 5 and the addend generation unit 160 outputs the value from the multiplier 161 selected by the selector 169 as the addend OF.

Furthermore, when the coefficient data in the AC component in intra-picture encoding in the H.263 system is inverse-quantized, the selector 169 selects the value outputted from the scale value generation section 110 based on the control information CNT_OF from the control unit 100 according to the operation term OF in FIG. 5 and the addend generation unit 160 outputs the value from the scale value generation section 110 selected by the selector 169 as the addend OF.

In this way, the addend generation unit 160 is provided with the multiplier 161 that multiplies the scale value of the scale value generation section 110 by the matrix value of the matrix value generation section 120 and the selector 219 that selects one value of the scale value, matrix value and the value obtained by multiplying the scale value by the matrix value and a predetermined constant value and supplies the selected value to the addition unit 150 as the addend OF.

Next, in FIG. 6, the shift quantity generation unit 180 includes a shift quantity table (shift quantity conversion unit) 181 that converts the value outputted from the scale table 111 of the scale value generation section 110 to shift quantity data. Furthermore, the shift quantity generation unit 180 further includes an adder 182 that adds a shift quantity addend SF_OF which is a predetermined value to the value outputted from the shift quantity table 181 and a selector 189 that selects one value of the value outputted from the shift quantity table 181, the value outputted from the adder 182 and a predetermined constant value according to the instruction of control information CNT_SF from the control unit 100. The shift quantity generation unit 180 outputs one of the value converted by the shift quantity table 181, the value outputted from the adder 182 and the predetermined constant value to the shift unit 170 according to instructed contents of the control information CNT_SF from the control unit 100 as shift quantity data SF.

In this way, the shift quantity generation unit 180 includes the shift quantity table 181 that converts the value outputted from the scale table 111 of the scale value generation section 110 to shift quantity data and supplies the value converted by the shift quantity table 181 to the shift unit 170 as the shift quantity data SF. Furthermore, the shift quantity generation unit 180 selects one of the value converted by the shift quantity table 181 and a predetermined constant value as the shift quantity data SF through the selector 189 and supplies the value to the shift unit 170. Furthermore, the selector 189 selects each value according to the type of coefficient data CD. Furthermore, the shift quantity generation unit 180 supplies a value resulting from addition of the shift quantity addend SF_OF to the selected shift quantity data SF to the shift unit 170 as the shift quantity data SF. This shift quantity addend SF_OF is the addend selected according to the type of coefficient data CD and outputted from the control unit 100.

The scale table 111, normalized table 112, shift quantity table 181, matrix table 121 and constant are stored in rewritable memories. In this way, even when a new standard encoding system appears, it is possible to support the new standard encoding system by only rewriting the table data and numerical values in the memories. The table data and numerical values in the memories can be rewritten by downloading them via a network, but the present invention is not limited to this and the table data and numerical values can also be rewritten by reading the data from a computer-readable recording medium.

Hereinafter, more specific operations of the inverse quantization circuit according to Embodiment 1 of the present invention will be described with reference to FIG. 1 to FIG. 6 using several examples of the encoding system.

First, processing of inverse-quantizing coefficient data quantized according to the JPEG system will be described. When, for example, inverse quantization is performed according to the JPEG system, the respective operations are switched according to control information based on the operation configuration shown in FIG. 5. Specifically, in the case of the JPEG system, as shown in FIG. 5, the coefficient data CD needs only to be multiplied by a matrix value from the matrix value generation section 120. Therefore, the control unit 100 reports the following control information to the respective operation units and generation units.

For example, the control unit 100 that controls the inverse quantization circuit instructs the multiplier 141 not to perform multiplication processing through the control information CNT_M1. Furthermore, the control unit 100 instructs the multiplier 142 to perform multiplication processing through the control information CNT_M2. Furthermore, the control unit 100 instructs the matrix value generation section 120 to output a matrix value through the control information CNT_MX. Furthermore, the control unit 100 instructs the adder 151 not to perform addition processing through the control information CNT_AP.

Furthermore, the control unit 100 instructs the rounding computing section 156 not to perform rounding processing through the control information CNT_RN. Furthermore, the control unit 100 instructs the shift computing section 171 not to perform shift operation through the control information CNT_SP. Furthermore, the control unit 100 instructs the DCT mismatch processing sections 191 and 193 not to perform DCT mismatch control processing. Furthermore, the control unit 100 instructs the saturation processing section 192 not to perform saturation processing.

This causes the multiplication unit 140 to output the output data MD, which is a value resulting from multiplication of the value of coefficient data CD by the matrix value which is the multiplier M2. Furthermore, the addition unit 150, rounding unit 155, shift unit 170 and post-processing unit 190 also output the data of the same value as that of the output data MD. As a result, the output terminal 19 outputs the reconstructed data RD having a value resulting from multiplication of the value of the coefficient data CD by the matrix value which is the multiplier M2. In this way, by reporting control information to the respective units in the configuration shown in FIG. 1 as described above, it is possible to realize such an inverse quantization expression that coefficient data $Sq_{vu}$ shown in the JPEG term in FIG. 2 is multiplied by the matrix value $Q_{vu}$ to obtain reconstructed data $R_{vu}$.

Furthermore, when, for example, inverse quantization is performed in the MPEG-2 system, inverse quantization is performed classified by the type of coefficient data as shown in FIG. 5.

First, the processing of inverse-quantizing coefficient data of the DC component in intra-picture encoding quantized in the MPEG-2 system will be described. When the coefficient data supplied to the input terminal 13 is coefficient data of the DC component in intra-picture encoding of the MPEG-2 system, the coefficient data needs only to be multiplied by a scale value as shown in FIG. 5. Therefore, the control unit 100 reports the following control information to the respective operation units and generation units.

For example, the control unit 100 instructs the multiplier 141 to perform multiplication processing through the control information CNT_M1. Furthermore, the control unit 100 instructs the multiplier 142 not to perform multiplication processing through the control information CNT_M2. Furthermore, the control unit 100 instructs the scale value generation section 110 to select the output value from the scale table 111 which stores the scale value corresponding to the scale index SCI specified by the control information CNT_SC through the control information CNT_SG. Furthermore, the control unit 100 instructs the scale processing section 210 to select the scale value through the control information CNT_SP. This causes the multiplier M1, which is the scale value, to be supplied to the multiplier 141 instructed to perform multiplication processing.

Furthermore, the control unit 100 instructs the adder 151 not to perform addition processing through the control information CNT_AP. Furthermore, the control unit 100 instructs the rounding computing section 156 not to perform rounding processing through the control information CNT_RN. Furthermore, the control unit 100 instructs the shift computing section 171 not to perform shift operation through the control information CNT_SP. Furthermore, the control unit 100 instructs the DCT mismatch processing section 191 not to perform DCT mismatch control processing through the control information CNT_MS1. Furthermore, the control unit 100 instructs the saturation processing section 192 to perform saturation processing through the control information CNT_CL. Furthermore, the control unit 100 instructs the DCT mismatch processing section 193 to perform DCT mismatch control processing through the control information CNT_MS2.

This causes the multiplication unit 140 to output the output data MD having a value resulting from multiplication of the value of the coefficient data CD by the multiplier M1, which is the scale value. Furthermore, the data of the same value as that of the output data MD is outputted from the addition unit 150, rounding unit 155 and shift unit 170. Furthermore, in the post-processing unit 190, the saturation processing section 192 first performs saturation processing on the output data SD, which is the data of the same value as the output data MD. Specifically, the saturation processing section 192 performs saturation processing so as to clip the output data SD to a value of, for example, "−2048" when the value of the output data SD is equal to or less than "−2048" or clip the value to, for example, "2047" when the coefficient value supplied to the saturation processing section 192 is equal to or greater than "2047."

Furthermore, in the post-processing unit 190, the DCT mismatch processing section 193 then adds the values of all supplied data to the data supplied from the saturation processing section 192 and performs, when the sum is an even number, such processing that the value of the highest frequency component, that is, the coefficient [7][7] component is changed. Specifically, when the sum of all the data supplied from the saturation processing section 192 is an even number, the DCT mismatch processing section 193 inverts the least significant bit of the value of the highest frequency component of the data, that is, the coefficient [7][7] component and outputs such data from the post-processing unit 190 as the reconstructed data RD.

In this way, by reporting the above described control information to the respective units in the configuration of FIG. 1, it is possible to realize such an inverse quantization expression that the coefficient data QF[0][0] as shown in the IntraDC term in the MPEG-2 in FIG. 2 is multiplied by a scale value "intra_dc_mult" to calculate reconstructed data F"[0][0].

Next, the processing of inverse-quantizing the coefficient data of the AC component of intra-picture encoding quantized in the MPEG-2 system will be described. When the coefficient data supplied to the input terminal 13 is the coefficient data of the AC component of intra-picture encoding in the MPEG-2 system, the coefficient data CD may be multiplied by a matrix value indicated by "MATRIX," and a value doubling the scale value indicated by "SCALE," and the result may be subjected to shift operation indicated by "SHIFT," and further DCT mismatch control processing and saturation processing indicated by "POST." For this purpose, the control unit 100 reports the following control information to the respective operation units and generation units.

For example, the control unit 100 instructs the multiplier 141 to perform multiplication processing through the control information CNT_M1. Furthermore, the control unit 100 instructs the multiplier 142 to perform multiplication processing through the control information CNT_M2. Furthermore, the control unit 100 instructs the scale value generation section 110 to select an output value from the scale table 111 storing the scale value corresponding to the scale index SCI specified by the control information CNT_SC through the control information CNT_SG. Furthermore, the control unit 100 instructs the scale processing section 210 to select a value doubling the scale value outputted from the operation section 211 through the control information CNT_SP. This causes the multiplier M1 doubling the scale value to be supplied to the multiplier 141 instructed to perform multiplication processing.

Furthermore, the control unit 100 instructs the matrix value generation section 120 to output a matrix value from the matrix table 121 selected according to the matrix data MXD supplied to the input terminal 12 through the control information CNT_MX. This causes the multiplier M2, which is a matrix value, to be supplied to the multiplier 142 instructed to perform multiplication processing.

Furthermore, the control unit 100 instructs the adder 151 not to perform addition processing through the control information CNT_AP. Furthermore, the control unit 100 instructs the rounding computing section 156 not to perform rounding processing through the control information CNT_RN. Furthermore, the control unit 100 instructs the shift computing section 171 to perform shift operation through the control information CNT_SP. Furthermore, the control unit 100 instructs the shift quantity generation unit 180 to output the shift quantity data SF equivalent to a 5-bit right shift corresponding to 1/32 through the control information CNT_SF. Furthermore, the control unit 100 instructs the DCT mismatch processing section 191 not to perform DCT mismatch control processing through the control information CNT_MS1. Furthermore, the control unit 100 instructs the saturation processing section 192 to perform saturation processing through the control information CNT_CL. Furthermore, the control unit 100 instructs the DCT mismatch processing section 193 to perform DCT mismatch control processing through the control information CNT_MS2.

This causes the multiplication unit 140 to output the output data MD resulting from doubling the coefficient data CD and multiplying the doubled coefficient data CD by the scale value and matrix value. Furthermore, the addition unit 150 outputs the output data AD of the same value as the output data MD and the rounding unit 155 also outputs the output data RN of the same value as the output data MD. In this way, the shift unit 170 outputs a value resulting from doubling the coefficient data CD, further multiplying the doubled coefficient data CD by the scale value and matrix value and shifting the resulting value by 5 bits to the right, that is, the result of a division by 32 as the output data SD. As a result, the shift unit 170 outputs a value resulting from doubling the coefficient data CD, further multiplying the doubled coefficient data CD by the scale value and matrix value and dividing the resulting value by 32.

Furthermore, as in the case of the coefficient data of the DC component of intra-picture encoding, the saturation processing section 192 of the post-processing unit 190 first performs saturation processing on the output data SD. Next, DCT mismatch processing section 193 adds values of all supplied data to the data supplied from the saturation processing section 192 and performs, when the sum thereof is an even number, such processing that the highest frequency component, that is, the value of the coefficient [7] [7] component is changed. In this way, the reconstructed data RD is outputted from the post-processing unit 190.

In this way, the above described control information is reported to the respective units in the configuration in FIG. 1. Therefore, by multiplying the coefficient data QF[v][u] by a constant "2", matrix value W[w][v][u] and scale value quantizer_scale and dividing the result by 32, it is possible to realize an inverse quantization expression for calculating the reconstructed data F'''[v][u] as shown in the IntraAC term in the MPEG-2 in FIG. 2.

Next, processing of inverse-quantizing the coefficient data of inter-picture encoding quantized in the MPEG-2 system will be described. When the coefficient data supplied to the input terminal 13 is coefficient data of inter-picture encoding in the MPEG-2 system, as shown in FIG. 5, the coefficient data CD may be multiplied by a matrix value indicated by "MATRIX," and a value doubling the scale value indicated by "SCALE," and the product of the matrix value and scale value with a sign added thereto may be added to this multiplication result, the value may further be subjected to shift operation indicated by "SHIFT" and may further be subjected to DCT mismatch control processing and saturation processing indicated by "POST" Therefore, the control unit 100 reports the following control information to the respective operation units and generation units.

For example, the control unit 100 instructs the multiplier 141 to perform multiplication processing through the control information CNT_M1. Furthermore, the control unit 100 instructs the multiplier 142 to perform multiplication processing through the control information CNT_M2. Furthermore, the control unit 100 instructs the scale value generation section 110 to select an output value from the scale table 111 storing the scale value corresponding to the scale index SCI specified by the control information CNT_SC through the control information CNT_SG. Furthermore, the control unit 100 instructs the scale processing section 210 to select a value doubling the scale value outputted from the operation section 211 through the control information CNT_SP. This causes the multiplier M1 doubling the scale value to be supplied to the multiplier 141 instructed to perform multiplication processing.

Furthermore, the control unit 100 instructs the matrix value generation section 120 to output the matrix value from the matrix table 121 selected according to the matrix data MXD supplied to the input terminal 12 through the control information CNT_MX. This allows the multiplier M2, which is a matrix value, to be supplied to the multiplier 142 instructed to perform multiplication processing.

Furthermore, the control unit 100 instructs the addend generation unit 160 to output the value obtained by multiplying the scale value and matrix value at the multiplier 161 as the addend OF through the control information CNT_OF. At the same time, the control unit 100 instructs the adder 151 to perform addition processing through the control information CNT_AP. Furthermore, the control unit 100 instructs the adder 151 to add the addend OF from the addend generation unit 160 to the output data MD from the multiplication unit 140 when the sign of the coefficient data CD is positive or subtract the addend OF from the output data MD when the sign of the coefficient data CD is negative. Specifically, by performing such addition processing, inverse quantization in association with a quantization system including a dead zone, for example, is performed.

Furthermore, the control unit 100 instructs the rounding computing section 156 not to perform rounding processing through the control information CNT_RN. Furthermore, the control unit 100 instructs the shift computing section 171 to perform shift operation through the control information CNT_SP. Furthermore, the control unit 100 instructs the shift quantity generation unit 180 to output a shift quantity equivalent to a 5-bit right shift corresponding to 1/32 through the control information CNT_SG. Furthermore, the control unit 100 instructs the DCT mismatch processing section 191 not to perform DCT mismatch control processing through the control information CNT_MS1. Furthermore, the control unit 100 instructs the saturation processing section 192 to perform saturation processing through the control information CNT_CL. Furthermore, the control unit 100 instructs the DCT mismatch processing section 193 to perform DCT mismatch control processing through the control information CNT_MS2.

This causes the multiplication unit 140 to output the output data MD resulting from doubling the coefficient data CD and further multiplying the doubled coefficient data CD by the scale value and matrix value. Furthermore, the addition unit 150 outputs the output data AD resulting from applying inverse quantization in association with quantization including a dead zone to the output data MD and the shift unit 170 outputs the output data SD resulting from shifting the output data AD from the addition unit 150 by 5 bits to the right, that is, dividing the output data AD by 32.

Furthermore, as in the case of the coefficient data of the DC component of intra-picture encoding, the saturation processing section 192 of the post-processing unit 190 first performs saturation processing on the output data SD. Next, the DCT mismatch processing section 193 adds values of all supplied data to the data supplied from the saturation processing section 192 and performs, when the sum thereof is an even number, such processing that the highest frequency component, that is, the value of the coefficient [7] [7] component is changed. In this way, reconstructed data RD is outputted from the post-processing unit 190.

In this way, the above described control information is reported to the respective units in the configuration in FIG. 1. Therefore, by multiplying a value (2×QF[v] [u]+Sign(QF[v][u])) obtained by multiplying the coefficient data QF[v][u] by a constant "2" and adding sign Sign(QF[v][u]) of the coefficient data by the scale value quantizer_scale and the matrix value W[w][m][n] and dividing the result by 32, it is possible to realize an inverse quantization expression for obtaining reconstructed data F"[v][u] as shown in the non-intra term in the MPEG-2 in FIG. 2.

As described above, the inverse quantization circuit according to Embodiment 1 of the present invention includes the first multiplier generation unit 10 that generates a first multiplier M1 for applying operation to quantized coefficient data CD, the second multiplier generation unit 20 that generates a second multiplier M2 for applying operation to the quantized coefficient data CD, the addend generation unit 160 that generates an addend OF for applying operation to the quantized coefficient data CD, the shift quantity generation unit 180 that generates shift quantity data SF that indicates a bit shift quantity for applying operation to the quantized coefficient data CD, the multiplication unit 140 that multiplies the quantized coefficient data CD by the first multiplier M1 and the second multiplier M2, the addition unit 150 that adds an addend OF to the output data MD outputted from the multiplication unit 140 and the shift unit 170 that performs bit shift operation to the output data AD outputted from the addition unit 150 according to the shift quantity data SF.

At least one operation unit of the multiplication unit 140, addition unit 150 and shift unit 170 is allowed to select whether or not to perform operation. Furthermore, at least one generation unit of the first multiplier generation unit 10, second multiplier generation unit 20, addend generation unit 160 and shift quantity generation unit 180 is allowed to select a value to be generated or a way of generating the data (value).

This eliminates the necessity for providing respective inverse quantization circuits depending on the encoding system, makes it possible to select operation of each operation unit operable for various encoding systems, configure a flexible inverse quantization circuit and thereby provide a versatile inverse quantization circuit applicable to various image encoding systems by a single circuit.

An example of embodiment has been described so far where inverse quantization is performed through an inverse quantization circuit made up of the functional blocks shown in FIG. 1, but the present invention is not particularly limited to this. For example, the present invention may also be an inverse quantization method including a first multiplier generating step of generating a first multiplier M1 for applying operation to quantized coefficient data CD, a second multiplier generating step of generating a second multiplier M2 for applying operation to the quantized coefficient data CD, an addend generating step of generating an addend OF for applying operation to the quantized coefficient data CD, a shift quantity generating step of generating shift quantity data SF indicating a bit shift quantity for applying operation to the quantized coefficient data CD, a multiplication processing step of multiplying the quantized coefficient data CD by the first multiplier M1 and the second multiplier M2, an addition processing step of adding an addend to output data MD from the multiplication processing step, and a shift processing step of performing bit shift operation to the output data AD from the addition processing step according to shift quantity data SF.

It may also be made selectable whether or not to perform operation in at least one operation step of the multiplication processing step, addition processing step and shift processing step. Furthermore, a value to be generated or a way of generating the data may also be made selectable in at least one generating step of the first multiplier generating step, second multiplier generating step, addend generating step and shift quantity generating step.

More specifically, the configuration may be such that a program for executing the respective steps of such an inverse quantization method is stored in a memory or the like, a CPU such as a microprocessor sequentially reads the program stored in the memory and executes processing according to the read program.

Embodiment 2

FIG. 7 is a block diagram showing a configuration of an inverse quantization circuit according to Embodiment 2 of the present invention.

As shown in FIG. 7, as in the case of Embodiment 1, the inverse quantization circuit according to Embodiment 2 of the present invention is an inverse quantization circuit that applies various types of operation to coefficient data CD supplied to an input terminal 13, reconstructs an original coefficient value and outputs reconstructed data RD which is a reconstructed coefficient value to an output terminal 19. Furthermore, the inverse quantization circuit of the present embodiment also realizes an inverse quantization circuit in a JPEG system targeted at still images, MPEG-1 system, MPEG-2 system, MPEG-4 system, H.263 system targeted at moving images and H.264 system also referred to as an MPEG-4AVC system, known as image encoding systems. Particularly, the inverse quantization circuit of the present embodiment adopts a configuration intended to reduce the circuit scale and applicable to the above described various types of encoding systems compared to Embodiment 1. Here, the components in FIG. 7 assigned the same reference numerals as those in FIG. 1 have the same configuration and detailed explanations thereof will be omitted.

In FIG. 7, the coefficient data CD is supplied to the input terminal 13 of the inverse quantization circuit. The inverse quantization circuit according to present Embodiment 2 also selectively applies operation to such coefficient data CD according to various encoding systems and encoding types of the encoding systems and thereby reconstructs coefficient values of the respective frequency components in block units of image data, obtained, for example, through discrete cosine transform.

The inverse quantization circuit shown in FIG. 7 is provided with operation units for carrying out various types of operation for inverse quantization on the coefficient data CD. The inverse quantization circuit is provided with a pre-processing unit 130, a multiplication unit 140, an addition unit 150, a shift unit 170 and a post-processing unit 199 as operation units.

The pre-processing unit 130 doubles the coefficient data CD and performs inverse quantization in association with quantization including a dead zone. The multiplication unit 140 performs inverse quantization on the coefficient data CD based on the quantization scale and also performs inverse quantization on the coefficient data CD based on a quantization matrix. The addition unit 150 adds a predetermined addend to the coefficient data CD. The shift unit 170 performs a bit shift on the coefficient data CD by a predetermined number of bits. The post-processing unit 199 performs saturation processing and DCT mismatch control processing on the coefficient data CD.

Furthermore, the inverse quantization circuit is provided with a first multiplier generation unit 10, a second multiplier generation unit 20, an addend generation unit 160 and a shift quantity generation unit 180. The first multiplier generation unit 10 generates a first multiplier M1 to perform inverse quantization based on the quantization scale at the multiplication unit 140. The second multiplier generation unit 20 generates a second multiplier M2 to perform inverse quantization based on the quantization matrix at the multiplication unit 140. The addend generation unit 160 generates a predetermined addend OF to be supplied to the addition unit 150. The shift quantity generation unit 180 generates shift quantity data SF to be supplied to the shift unit 170.

Furthermore, the inverse quantization circuit is also provided with a control unit 100. The control unit 100 outputs control information for instructing the pre-processing unit 130, multiplication unit 140, addition unit 150, shift unit 170 and post-processing unit 199 as to whether or not to perform their respective operations.

In the inverse quantization circuit according to Embodiment 2 of the present invention as in the case of Embodiment 1, the respective operation units are allowed to select whether or not to be included in operation for inverse quantization according to instructions. Specifically, each operation unit is configured, for example, to selectively switch between data subjected to operation and data not subjected to operation, and output the data. Furthermore, the contents of operation such as a shift quantity in the case of shift operation of performing a bit shift are also made selectable.

Furthermore, the control unit 100 outputs control information for instructing the multiplier generation unit 10, multiplier generation unit 20, addend generation unit 160 and shift quantity generation unit 180 about a value to be generated or a way of generating data.

The inverse quantization circuit according to Embodiment 2 of the present invention has such a basic configuration and realizes a versatile inverse quantization circuit operable for various image encoding systems by a single circuit by selectively switching whether or not to perform operation and processing contents of the respective operation units depending on various encoding systems. Particularly, the inverse quantization circuit according to Embodiment 2 of the present invention adopts a configuration applicable to various existing encoding systems and intended to reduce the circuit scale. Hereinafter, the detailed configuration of the inverse quantization circuit according to Embodiment 2 of the present invention will be described.

As shown in FIG. 7, the coefficient data CD supplied to the input terminal 13 of the inverse quantization circuit is supplied to the pre-processing unit 130 first. The pre-processing unit 130 includes a 2× multiplier 131 for doubling the coefficient data CD and an adder 132 for carrying out processing applicable to a quantization system including a dead zone defined in the MPEG-1 system, MPEG-2 system, MPEG-4 system and H.263 system. The adder 132 is provided to support quantization systems including a dead zone. The coefficient data CD supplied to the pre-processing unit 130 is supplied to the 2× multiplier 131 and the output data of the 2× multiplier 131 is supplied to one input end of the adder 132. Furthermore, the sign bit of the coefficient data CD is supplied to the other input end of the adder 132. Furthermore, the output data of the adder 132 is supplied to the multiplication unit 140 as the output data FD of the pre-processing unit 130.

Furthermore, the 2× multiplier 131 of the pre-processing unit 130 is configured so as to be able to perform switching control as to whether or not to perform 2× operation through control information CNT_F1 from the control unit 100. Furthermore, the adder 132 is configured so as to be able to perform switching control as to whether or not to perform processing for quantization including a dead zone through control information CNT_F2 from the control unit 100.

In such a configuration of the pre-processing unit 130, when instructed not to perform operation from the control unit 100 using the control information CNT_F1 and control information CNT_F2 respectively, the pre-processing unit outputs the coefficient data CD supplied to the input terminal 13 as output data FD of the pre-processing unit 130.

Furthermore, on the contrary, when, for example, instructed to perform operation from the control unit 100 using the control information CNT_F1 and control information CNT_F2 respectively, the pre-processing unit 130 outputs data resulting from doubling the coefficient data CD supplied to the input terminal 13 and further performing processing for quantization including a dead zone as the output data FD.

As described above, the pre-processing unit 130 has the function of operation of doubling the coefficient data CD and the function of operation of adding the value for the range of a dead zone to the coefficient data CD and makes it selectable whether or not to include these operations in operation targets. The pre-processing unit is configured to selectively switch between data subjected to operation and data not subjected to operation in these operations and output the data.

In the pre-processing unit 130, the 2× multiplier 131 may also be, for example, a one-bit left shift circuit instead of 2× multiplication using a multiplier and is only required to have at least the function of operation of doubling the coefficient data CD. Furthermore, the 2× multiplier 131 may also be configured to be, for example, a multiplier or a shift circuit for which a multiple can be set from outside and select a multiple suitable for processing as appropriate. Furthermore, the adder 132 may also be a circuit that adds a predetermined value to the data from the 2× multiplier 131 instead of adding a sign bit to the data from the 2× multiplier 131 and is only required to have at least the function of operation for quantization including a dead zone based on the encoding system.

Next, the output data FD outputted from the pre-processing unit 130 is supplied to the multiplication unit 140 as shown in FIG. 7. The multiplication unit 140 has a configuration similar to that of Embodiment 1 and includes a first multiplier 141 (hereinafter simply referred to as a "multiplier 141" as appropriate) and a second multiplier 142 (hereinafter simply referred to as a "multiplier 142" as appropriate). The multiplier 141 multiplies the output data FD from the pre-processing unit 130 by a first multiplier M1 (hereinafter simply referred to as a "multiplier M1" as appropriate) supplied from the first multiplier generation unit 10 (hereinafter simply referred to as a "multiplier generation unit 10" as appropriate). The multiplier 142 multiplies the data outputted from the multiplier 141 by a second multiplier M2 (hereinafter simply referred to as a "multiplier M2" as appropriate) supplied from the second multiplier generation unit 20 (hereinafter simply referred to as a "multiplier generation unit 20" as appropriate).

Furthermore, in the multiplication unit 140, the multiplier 141 is configured so as to be able to perform switching control as to whether or not to perform operation of multiplying the multiplier M1 through control information CNT_M1 from the control unit 100. Furthermore, the multiplier 142 is configured so as to be able to perform switching control as to whether or not to perform operation of multiplying the multiplier M2 through control information CNT_M2 from the control unit 100. In such a configuration of the multiplication unit 140, when, for example, instructed not to perform operation from the control unit 100 using the control information CNT_M1 and control information CNT_M2 respectively, the multiplication unit 140 outputs the output data FD from the pre-processing unit 130 as output data MD of the multiplication unit 140.

Furthermore, on the contrary, when, for example, instructed to perform operation from the control unit 100 using the control information CNT_M1 and control information CNT_M2 respectively, the multiplication unit 140 outputs data having a value resulting from multiplication of the output data FD from the pre-processing unit 130 by the multiplier M1 and multiplier M2 as the output data MD.

As described above, the multiplication unit 140 has the function of operation of multiplying the coefficient data CD by the multiplier M1 and multiplier M2 and is configured to selectively switch between data subjected to operation and data not subjected to operation in such processing of multiplication operation and output the data.

The multiplication unit 140 may also be configured to multiply the output data FD by the multiplier M2 first and then the multiplier M1 instead of the configuration of multiplying the output data FD by the multiplier M1 first and then multiplier M2 as shown in FIG. 7. Furthermore, the multiplication unit 140 may also be configured to multiply the output data FD by a value of the product of the multiplier M1 and multiplier M2.

Next, the multiplier generation unit 10 has a configuration similar to that in Embodiment 1 and generates the multiplier M1 to be supplied to the above described multiplication unit 140. The multiplier generation unit 10 mainly generates a scale value indicating a quantization width defined for each block such as macro block called a "quantization scale" in an image encoding system. The multiplier generation unit 10 is provided with a scale value generation section 110 to generate such a scale value as shown in FIG. 7. The scale value generation section 110 has a conversion function of converting a scale index SCI supplied to an input terminal 11 based on, for example, a predetermined conversion rule and outputs a predetermined scale value. Furthermore, the multiplier generation unit 10 also has a scale processing section 210 that outputs the multiplier M1 by selectively applying operation for each encoding system and encoding type in the encoding system to the scale value generated by the scale value generation section 110.

Next, the multiplier generation unit 20 also has a configuration similar to that of Embodiment 1 and generates the multiplier M2 to be supplied to the above described multiplication unit 140. The multiplier generation unit 20 mainly generates a matrix value called a "quantization matrix" in which a quantization width is set for each frequency in the image encoding system. For this reason, as shown in FIG. 7, the multiplier generation unit 20 is provided with a matrix value generation section 120 to generate such a matrix value.

Next, the output data MD outputted from the multiplication unit 140 is supplied to the addition unit 150 as shown in FIG. 7. The addition unit 150 also has a configuration similar to that of Embodiment 1 and has an adder 151 that adds an addend OF supplied from the addend generation unit 160 to the output data MD from the multiplication unit 140.

Next, the addend generation unit 160 generates an addend OF to be supplied to the above described addition unit 150. The addend generation unit 160 outputs an addend for addition processing in DCT mismatch control processing when performing inverse quantization in the H.263 system and MPEG-4 system as such an addend OF and outputs an addend for rounding processing in accordance with a right shift when performing inverse quantization in the H.264 system. Furthermore, the addend generation unit 160 selectively outputs such an addend OF depending on the encoding system according to instruction of control information CNT_AG from the control unit 100 and supplies the addend OF to the addition unit 150. As described above, the addend generation unit 160 generates the addend OF for applying operation to the coefficient data.

Next, output data AD outputted from the addition unit 150 is supplied to the shift unit 170 as shown in FIG. 7. The shift unit 170 also has a configuration similar to that of Embodiment 1 and includes a shift computing section 171 that performs a bit shift for the output data AD from the addition unit 150 according to shift quantity data SF supplied from the shift quantity generation unit 180.

Next, the shift quantity generation unit 180 also has a configuration similar to that of Embodiment 1 and generates the shift quantity data SF indicating the shift quantity supplied to the above described shift unit 170 for scale matching defined in each encoding system.

Next, output data SD outputted from the shift unit 170 is supplied to the post-processing unit 199 as shown in FIG. 7. The post-processing unit 199 includes a saturation processing section 192 that performs saturation processing on the output data SD from the shift unit 170 and a DCT mismatch processing section 193 that performs DCT mismatch control processing. Furthermore, the saturation processing section 192 is configured so as to be able to perform switching control as to whether or not to perform saturation processing through control information CNT_CL from the control unit 100 and the DCT mismatch processing section 193 is configured so as to be able to perform switching control as to whether or not to perform DCT mismatch control processing through control information CNT_MS from the control unit 100.

As described above, the MPEG-1 system, MPEG-4 system and H.263 system are defined to perform saturation processing after the DCT mismatch control processing and the MPEG-2 system is defined to perform DCT mismatch control processing after saturation processing. Therefore, in the inverse quantization circuit according to the present embodiment, when, for example, inverse quantization processing is performed on the coefficient data CD in the MPEG-1 system, the control unit 100 instructs the saturation processing section 192 to perform saturation processing through the control information CNT_CL and also instructs the DCT mismatch processing section 193 not to perform DCT mismatch control processing through the control information CNT_MS. Furthermore, the control unit 100 instructs the addend generation unit 160 to output the addend OF for addition processing in the DCT mismatch control processing through the control information CNT_AG and instructs the addition unit 150 to add the addend OF through the control information CNT_AP.

Specifically, in the MPEG-1 system, when a reconstructed coefficient value for coefficient data other than intraDC is an even number, the sign of the coefficient data, that is Sign (dct_zz[i]) is subtracted, and therefore the addend generation unit 160 outputs a value resulting from inverting the sign of the coefficient data as the addend OF. This causes saturation processing to be executed after the DCT mismatch control processing as defined in the MPEG-1 system.

Furthermore, when inverse quantization processing is performed on the coefficient data CD according to the MPEG-2 system, the control unit 100 instructs the saturation processing section 192 to perform saturation processing through the control information CNT_CL and instructs the DCT mismatch processing section 193 to perform DCT mismatch control processing through the control information CNT_MS. Furthermore, the control unit 100 instructs the addition unit 150 not to add the addend OF through the control information CNT_AP. This causes DCT mismatch control processing to be performed after the saturation processing as defined in the MPEG-2 system.

The inverse quantization circuit of the present embodiment performs the operation described above according to the control information in each encoding system and the post-processing unit 199 outputs the reconstructed data RD having a reconstructed coefficient value to the output terminal 19.

As described above, a case has been described where operation in each operation unit and a value in each generation unit and a way of generating data are assumed to be selectable, but the present invention is not particularly limited to this. For example, depending on the type of the applicable encoding system, at least one operation unit of the multiplication unit 140 and shift unit 170 may be configured so as to be able to select whether or not to perform operation, and at least one generation unit of the first multiplier generation unit 10, second multiplier generation unit 20 and shift quantity generation unit 180 may be configured so as to be able to select a value to be generated or a way of generating data.

Hereinafter, the operation of the inverse quantization circuit according to Embodiment 2 of the present invention configured as shown above will be described.

FIG. 8 shows a list of operations for the respective inverse quantization expressions in the inverse quantization circuit according to Embodiment 2 of the present invention. FIG. 8 puts together the respective inverse quantization expressions in FIG. 2 to FIG. 4 as a list so as to be realized through common operations. In FIG. 8, "COEFFICIENT" denotes coefficient data to be inverse-quantized, "2" denotes a multiplier 2, "SIGN" denotes a sign indicating positive/negative of the coefficient data and indicates processing of quantization including a dead zone using the sign of the coefficient data. Furthermore, "MATRIX" denotes a matrix value, "SCALE" denotes a scale value, "ADDEND" denotes an addend in inverse quantization, "SHIFT" denotes shift operation and "CLIP" denotes saturation processing, "DCT MISS" denotes DCT mismatch control processing. Furthermore, "NORMALIZATION" denotes a normalization coefficient value defined in the H.264 system. Furthermore, numbers such as "0," "1" and "8" denote constants represented by the number. Furthermore, locations indicated by "SHIFT" "CLIP" and "DCT MISS" indicate that the corresponding processing is performed and locations indicated by arrows indicate that the corresponding processing is not performed.

Particularly, the operation indicated by "SIGN" in FIG. 8 is intended to achieve commonality of processing of adding up addends of quantization including a dead zone represented by Sign(dct_zz[i]) in the MPEG-1 system, Sign(QF[v][u]) in the MPEG-2 system and addition of 1 in the H.263 and MPEG-4 systems. Furthermore, the operation indicated by "ADDEND" in FIG. 8 is intended to achieve commonality of DCT mismatch control processing in the H.263 system and MPEG-4 system with respect to rounding processing in accordance with a right shift for scale matching in the H.264 system and reduce the circuit scale.

In this way, the respective inverse quantization expressions in the respective encoding systems in FIG. 2 to FIG. 4 can also be expressed by common operation expressions as shown in FIG. 8. Specifically, the configuration of the inverse quantization circuit according to Embodiment 2 of the present invention described in FIG. 7 is the circuit that realizes common operation expressions shown in FIG. 8 and is applicable to the respective encoding systems by switching between the respective operations to be executed using the above described control information. The inverse quantization circuit according to Embodiment 2 of the present invention achieves commonality of operation and thereby prevents the circuit scale from further increasing.

Hereinafter, specific operations of the inverse quantization circuit according to Embodiment 2 of the present invention will be described with reference to FIG. 2 to FIG. 4, FIG. 7 and FIG. 8 by taking several encoding systems by way of example.

First, the processing of inverse-quantizing coefficient data quantized in the JPEG system will be described. When, for example, inverse quantization is performed in the JPEG system, each operation is switched through control information according to the operation configuration shown in FIG. 8. Specifically, in the case of the JPEG system, as shown in FIG. 8, the coefficient data CD needs only to be multiplied by the matrix value from the matrix value generation section 120. Therefore, the control unit 100 reports the following control information to the respective processing units and generation units.

For example, the control unit 100 that controls the inverse quantization circuit instructs the 2× multiplier 131 not to perform 2× operation through the control information CNT_F1. Furthermore, the control unit 100 instructs the adder 132 not to perform addition processing for quantization including a dead zone through the control information CNT_F2. Furthermore, the control unit 100 instructs the multiplier 141 not to perform multiplication processing through the control information CNT_M1. Furthermore, the control unit 100 instructs the multiplier 142 not to perform multiplication processing through the control information CNT_M2.

Furthermore, the control unit 100 instructs the matrix value generation section 120 to output a matrix value through the control information CNT_MX. Furthermore, the control unit 100 instructs the adder 151 not to perform addition processing through the control information CNT_AP. Furthermore, the control unit 100 instructs the shift computing section 171 not to perform shift operation through the control information CNT_SP. Furthermore, the control unit 100 instructs the saturation processing section 192 not to perform saturation processing through the control information CNT_CL. Furthermore, the control unit 100 instructs the DCT mismatch processing section 193 not to perform DCT mismatch control processing through the control information CNT_MS.

This causes the pre-processing unit 130 to output the output data FD having the same value as the coefficient data CD supplied to the input terminal 13 and causes the multiplication unit 140 to output the output data MD having a value resulting from multiplication of the value of the coefficient data CD by the matrix value, which is the multiplier M2. Furthermore, the addition unit 150, shift unit 170 and post-processing unit 199 also output data having the same value as that of the output data MD. As a result, the output terminal 19 outputs the reconstructed data RD having a value resulting from multiplication of the value of the coefficient data CD by the matrix value, which is the multiplier M2. In this way, by reporting the above described control information to the respective units in the configuration in FIG. 7, it is possible to realize such an inverse quantization expression that multiplies the coefficient data $Sq_{vu}$ shown in the JPEG term in FIG. 2 by the matrix value $Q_{vu}$ and obtains the reconstructed data $R_{vu}$.

Furthermore, when, for example, inverse quantization is performed in the MPEG-2 system, inverse quantization is performed classified by the type of coefficient data as shown in FIG. 8.

First, the processing of inverse-quantizing the coefficient data of the DC component of intra-picture encoding quantized in the MPEG-2 system will be described. When the coefficient data supplied to the input terminal 13 is coefficient data of the DC component of intra-picture encoding in the MPEG-2 system, the coefficient data needs only to be multiplied by a scale value as shown in FIG. 8. Therefore, the control unit 100 reports the following control information to the respective operation units and generation units.

For example, the control unit 100 instructs the 2× multiplier 131 not to perform 2× operation through the control information CNT_F1. Furthermore, the control unit 100 instructs the adder 132 not to perform addition processing for quantization including a dead zone through the control information CNT_F2. Furthermore, the control unit 100 instructs the multiplier 141 to perform multiplication processing through the control information CNT_M1. Furthermore, the control unit 100 instructs the multiplier 142 not to perform multiplication processing through the control information CNT_M2.

Furthermore, the control unit 100 instructs the scale value generation section 110 to output a scale value corresponding to the scale index SCI specified by control information CNT_SC through control information CNT_SG. Furthermore, the control unit 100 instructs the adder 151 not to perform addition processing through control information CNT_AP. Furthermore, the control unit 100 instructs the shift computing section 171 not to perform shift operation through control information CNT_SP. Furthermore, the control unit 100 instructs the saturation processing section 192 to perform saturation processing through the control information CNT_CL. The control unit 100 instructs the DCT mismatch processing section 193 to perform DCT mismatch control processing through the control information CNT_MS.

This causes the pre-processing unit 130 to output the output data FD having the same value as that of the coefficient data CD supplied to the input terminal 13 and causes the multiplication unit 140 to output the output data MD having a value resulting from multiplication of the value of the coefficient data CD by the scale value, which is the multiplier M1. Furthermore, the addition unit 150 and shift unit 170 also output data having the same value as that of the output data MD. As a result, the shift unit 170 outputs the output data SD having a value resulting from multiplication of the value of the coefficient data CD by the scale value.

Furthermore, as in the case of Embodiment 1, the saturation processing section 192 in the post-processing unit 199 first performs saturation processing on the output data SD. Next, the DCT mismatch processing section 193 adds values of all supplied data to the data supplied from the saturation processing section 192 and performs, when the sum thereof is an even number, processing such that the highest frequency component, that is, the value of the coefficient [7] [7] component is changed. In this way, the reconstructed data RD is outputted from the post-processing unit 199.

In this way, the above described control information is reported to the respective units in the configuration in FIG. 7 and it is thereby possible to realize such an inverse quantization expression that coefficient data QF[0][0] as shown in the IntraDC term in the MPEG-2 in FIG. 2 is multiplied by scale value intra_dc_mult to obtain reconstructed data F"[0][0].

Next, the processing of inverse-quantizing coefficient data of the AC component of intra-picture encoding quantized in the MPEG-2 system will be described. When the coefficient data supplied to the input terminal 13 is coefficient data of the AC component of intra-picture encoding in the MPEG-2 system, the coefficient data may be multiplied by constant "2," scale value indicated by "SCALE," and matrix value indicated by "MATRIX" as shown in FIG. 8 and shift operation indicated by "SHIFT" may be further performed. Therefore, the control unit 100 reports the following control information to the respective operation units and generation units.

For example, the control unit 100 instructs the 2× multiplier 131 to perform 2× operation through the control information CNT_F1. Furthermore, the control unit 100 instructs the adder 132 not to perform addition processing for quantization including a dead zone through the control information CNT_F2. Furthermore, the control unit 100 instructs the multiplier 141 to perform multiplication processing through the control information CNT_M1. Furthermore, the control unit 100 instructs the multiplier 142 to perform multiplication processing through the control information CNT_M2.

Furthermore, the control unit 100 instructs the scale value generation section 110 to select an output value from the scale table storing scale values corresponding to the scale index SCI specified by the control information CNT_SC through the control information CNT_SG. Furthermore, the control unit 100 instructs the scale processing section 210 to select a scale value outputted from the scale value generation section 110 through control information CNT_SP. This causes the scale value to be supplied to the multiplier 141 instructed to perform multiplication processing as the multiplier M1.

Furthermore, the control unit 100 instructs the matrix value generation section 120 to output a matrix value corresponding to the matrix data MXD supplied to the input terminal 12 through control information CNT_MX. Furthermore, the control unit 100 instructs the adder 151 not to perform addition processing through the control information CNT_AP. Furthermore, the control unit 100 instructs the shift computing section 171 to perform shift operation through the control information CNT_SP. Furthermore, the control unit 100 instructs the shift quantity generation unit 180 to output the shift quantity data SF equivalent to a 5-bit right shift corresponding to 1/32 through control information CNT_SG. Furthermore, the control unit 100 instructs the saturation processing section 192 to perform saturation processing through the control information CNT_CL. Furthermore, the control unit 100 instructs the DCT mismatch processing section 193 to perform DCT mismatch control processing through the control information CNT_MS.

This causes the pre-processing unit 130 to output the output data FD doubling the coefficient data CD supplied to the input terminal 13. Furthermore, the multiplication unit 140 outputs the output data MD resulting from doubling the coefficient data CD and multiplying the doubled coefficient data CD by the scale value and matrix value. Furthermore, the addition unit 150 outputs the output data AD having the same value as that of the output data MD. The shift unit 170 outputs a value resulting from doubling the coefficient data CD and multiplying the doubled coefficient data CD by the scale value and matrix value and further shifting the value by 5 bits to the right, that is, dividing the value by 32 as the output data SD. As a result, the shift unit 170 outputs the output data SD resulting from doubling the coefficient data CD, multiplying the doubled coefficient data CD by the scale value and matrix value and further dividing the value by 32.

Furthermore, as in the case of Embodiment 1, the saturation processing section 192 in the post-processing unit 199 performs saturation processing on the output data SD. Next, the DCT mismatch processing section 193 adds values of all supplied data to the data supplied from the saturation processing section 192 and performs, when the sum is an even number, such processing that the highest frequency component, that is, the value of the coefficient [7] [7] component is changed. In this way, the post-processing unit 199 outputs the reconstructed data RD.

In this way, the above described control information in the configuration in FIG. 7 is reported to the respective units. Therefore, by multiplying the coefficient data QF[v][u] by constant "2," matrix value W[w][v][u] and scale value quantizer_scale and dividing the result by 32, it is possible to realize an inverse quantization expression for calculating reconstructed data F"[v][u] as shown in the IntraAC term in the MPEG-2 in FIG. 2.

Next, the processing of inverse-quantizing the coefficient data of inter-picture encoding quantized in the MPEG-2 system will be described. When the coefficient data supplied to the input terminal 13 is coefficient data of inter-picture encoding in the MPEG-2 system, as shown in FIG. 8, the coefficient data may be multiplied by a constant "2," addition processing may be applied for quantization including a dead zone indicated by "SIGN," such a data value may be multiplied by the scale value indicated by "SCALE," and matrix value indicated by "MATRIX" subjected to shift operation indicated by "SHIFT," the value may be further subjected to saturation processing indicated by "CLIP," and DCT mismatch control processing indicated by "DCT MISS." Therefore, the control unit 100 reports the following control information to the respective operation units and generation units.

For example, the control unit 100 instructs the 2× multiplier 131 to perform 2× operation through the control information CNT_F1. Furthermore, the control unit 100 instructs the adder 132 to perform addition processing to the addend of quantization including a dead zone through the control information CNT_F2. Furthermore, the control unit 100 instructs the multiplier 141 to perform multiplication processing through the control information CNT_M1. Furthermore, the control unit 100 instructs the multiplier 142 to perform multiplication processing through the control information CNT_M2.

Furthermore, the control unit 100 instructs the scale value generation section 110 to select an output value from the scale table storing scale values corresponding to the scale index SCI specified by the control information CNT_SC through the control information CNT_SG. Furthermore, the control unit 100 instructs the scale processing section 210 to select a scale value outputted from the scale value generation section 110 through the control information CNT_SP. This causes a scale value to be supplied to the multiplier 141 instructed to perform multiplication processing as the multiplier M1.

Furthermore, the control unit 100 instructs the matrix value generation section 120 to output a matrix value corresponding to matrix data MXD supplied to the input terminal 12 through the control information CNT_MX. Furthermore, the control unit 100 instructs the adder 151 not to perform addition processing through the control information CNT_AP.

Furthermore, the control unit 100 instructs the shift computing section 171 to perform shift operation through the control information CNT_SP. Furthermore, the control unit 100 instructs the shift quantity generation unit 180 to output the shift quantity data SF equivalent to a 5-bit right shift corresponding to 1/32 through the control information CNT_SG. Furthermore, the control unit 100 instructs the saturation processing section 192 to perform saturation processing through the control information CNT_CL. Furthermore, the control unit 100 instructs the DCT mismatch processing section 193 to perform DCT mismatch control processing through the control information CNT_MS.

This causes the pre-processing unit 130 to output the output data FD resulting from doubling the coefficient data CD supplied to the input terminal 13 and applying inverse quantization in association with quantization including a dead zone. Furthermore, the multiplication unit 140 outputs the output data MD resulting from multiplication of the output data FD from the pre-processing unit 130 by the scale value and matrix value. Furthermore, the addition unit 150 outputs the output data AD equal to the output data MD. The shift unit 170 outputs the output data SD resulting from shifting the output data AD from the addition unit 150 by 5 bits to the right, that is, dividing the value by 32. Furthermore, the post-processing unit 199 outputs data resulting from subjecting the output data SD from the shift unit 170 to saturation processing and DCT mismatch control processing.

In this way, as described in the configuration in FIG. 7, the control information is reported to the respective units. Therefore, by multiplying a value (2×QF[v][u]+Sign(QF[v][u])) resulting from multiplication of coefficient data QF[v][u] by a constant "2," and adding sign Sign(QF[v] [u]) of the coefficient data thereto by the scale value quantizer_scale and matrix value W[w][m][n] and dividing the result by 32, it is possible to realize an inverse quantization expression for calculating reconstructed data F"[v][u] as shown in the non-intra term of MPEG-2 in FIG. 2.

As described above, the inverse quantization circuit according to Embodiment 2 of the present invention is provided with the first multiplier generation unit 10 that generates the first multiplier M1 for applying operation to quantized coefficient data CD, the second multiplier generation unit 20 that generates the second multiplier M2 for applying operation to the quantized coefficient data CD, the shift quantity generation unit 180 that generates shift quantity data SF indicating the bit shift quantity for applying operation to the quantized coefficient data CD, the multiplication unit 140 that multiplies the quantized coefficient data CD by the first multiplier M1 and second multiplier M2 and the shift unit 170 that performs bit shift operation to the output data MD outputted from the multiplication unit 140 according to shift quantity data SF.

At least one operation unit of the multiplication unit 140 and shift unit 170 can select whether or not to perform operation. Furthermore, at least one generation unit of the first multiplier generation unit 10, second multiplier generation unit 20 and shift quantity generation unit 180 can select a value to be generated or a way of generating data.

This eliminates the necessity for providing respective inverse quantization circuits depending on the encoding system, makes it possible to select operation of the respective operation units according to various encoding systems, construct a flexible inverse quantization circuit and thereby provide a versatile inverse quantization circuit operable for various image encoding systems by a single circuit.

An example of the embodiment for performing inverse quantization through an inverse quantization circuit made up of the functional blocks shown in FIG. 7 has been described but the present invention is not particularly limited to this. For example, the inverse quantization method may also include a first multiplier generating step of generating a first multiplier M1 for applying operation to quantized coefficient data CD, a second multiplier generating step of generating a second multiplier M2 for applying operation to the quantized coefficient data CD, a shift quantity generating step of generating shift quantity data SF indicating a bit shift quantity for applying operation to the quantized coefficient data CD, a multiplication processing step of multiplying the quantized coefficient data CD by a first multiplier M1 and a second multiplier M2 and a shift processing step of performing bit shift operation to output data MD from the multiplication processing step according to the shift quantity data SF.

At least one operation step of the multiplication processing step and shift processing step may be enabled to select whether or not to perform operation. Furthermore, at least one generating step of the first multiplier generating step, second multiplier generating step and shift quantity generating step may be enabled to select a value to be generated or a way of generating data.

More specifically, such a configuration may also be adopted that a program for executing the respective steps of such an inverse quantization method is stored in a memory or the like, a CPU such as a microprocessor sequentially reads the program stored in the memory and executes processing according to the read program.

Here, the difference between the inverse quantization circuit of Embodiment 1 and the inverse quantization circuit of Embodiment 2 will be described. The inverse quantization circuit of Embodiment 1 adopts the configuration that stresses versatility, while the inverse quantization circuit of Embodiment 2 adopts the configuration that stresses a reduction of circuit scale.

As an example thereof, DCT mismatch control processing in the MPEG-1 system of inter-picture encoding and rounding processing in the H.264 system in FIG. 8 are expressed with the same operation term ("ADDEND" shown in FIG. 8). In this way, when the DCT mismatch control processing and the rounding processing are expressed with the same operation term, it will be difficult to support a standard which may appear in the future in a new encoding system including both elements of the DCT mismatch control processing and rounding processing. Therefore, in the operation configuration shown in FIG. 5, the DCT mismatch control processing and rounding processing are expressed as different operation terms. In this way, since a plurality of different operations are never carried out by one operation unit in Embodiment 1, it is possible to realize a versatile inverse quantization circuit.

Furthermore, as another example, an offset for quantization with a dead zone (operation term indicated with "SIGN") is connected to a quantization scale value and quantization matrix in the operation configuration shown in FIG. 8, and has a low degree of independence. In contrast, in the operation configuration shown in FIG. 5, the quantization scale value (multiplier M1) and offset for quantization with a dead zone (addend OF) are expressed as separate values. The "quantization with a dead zone" refers to processing of rounding a value in the vicinity of 0 to 0 and what range of values should be rounded to 0, that is, what kind of offset should be added varies depending on the encoding system. Therefore, Embodiment 1 minimizes the dependency relationship between the respective operation terms and thereby controls the respective operations independently of each other and can thereby realize a versatile inverse quantization circuit.

As a further example, the inverse quantization circuit in Embodiment 2 shown in FIG. 7 is provided with the 2× multiplier 131 that doubles coefficient data. This 2× multiplier 131 is provided to adjust the value of quantization scale and adjust the relationship between the quantization scale and an offset for quantization with a dead zone, but an encoding system that multiplies the coefficient data by a numerical value other than 2 may appear in the future. Therefore, the inverse quantization circuit in Embodiment 1 performs the operation of doubling this coefficient data through the operation section 211 shown in FIG. 6. Here, the value multiplied at the operation section 211 is not fixed but can be changed depending on the encoding system. Therefore, Embodiment 1 does not fix parameters yet to be adjusted, and can thereby realize a more versatile inverse quantization circuit.

As shown above, the inverse quantization circuit according to Embodiment 1 has a configuration with increased versatility.

Embodiment 3

FIG. 9 is a block diagram showing a configuration of an image reproducing apparatus according to Embodiment 3 of the present invention. The image reproducing apparatus includes, for example, a personal computer, set top box, optical disk recorder, optical disk player, television, portable information terminal apparatus and cellular phone.

The image reproducing apparatus 300 shown in FIG. 9 is provided with an encoded stream acquiring unit 301, a quantized coefficient data extracting unit 302, an inverse quantization circuit 303, an image data transforming unit 304 and an output unit 305.

The encoded stream acquiring unit 301 acquires an encoded stream. The encoded stream acquiring unit 301 acquires an encoded stream via a network, acquires an encoded stream by reading an optical disk such as a DVD or Blu-ray disk or acquires an encoded stream from broadcast wave via an antenna.

The quantized coefficient data extracting unit 302 extracts quantized coefficient data resulting from quantization of a coefficient value for each frequency obtained by transforming image data based on an encoding system from among encoded streams acquired by the encoded stream acquiring unit 301.

The inverse quantization circuit 303 is one of the inverse quantization circuits described in Embodiment 1 and Embodiment 2. The inverse quantization circuit 303 performs inverse quantization on the quantized coefficient data extracted by the quantized coefficient data extracting unit 302 by applying operation to the quantized coefficient data and reconstructs a coefficient value.

The image data transforming unit 304 transforms the coefficient value reconstructed by the inverse quantization circuit 303 to image data. The output unit 305 outputs the image data transformed by the image data transforming unit 304 to the monitor 310. The monitor 310 displays the image data outputted from the output unit 305.

Since the image reproducing apparatus 300 is mounted with one of the inverse quantization circuits described in Embodiment 1 and Embodiment 2, the image reproducing apparatus 300 according to the present embodiment can perform inverse quantization operable for various encoding systems by a single circuit.

The above described specific embodiments mainly include the inventions in the following configuration.

The inverse quantization circuit according to an aspect of the present invention is an inverse quantization circuit that performs inverse quantization by applying operation to quantized coefficient data resulting from quantization of a coefficient value for each frequency obtained by transforming image data based on an encoding system and reconstructs the coefficient value, including a first multiplier generation unit that generates a first multiplier for application of the operation to the quantized coefficient data, a second multiplier generation unit that generates a second multiplier for application of the operation to the quantized coefficient data, a shift quantity generation unit that generates shift quantity data indicating a bit shift quantity for application of the operation to the quantized coefficient data, a multiplication unit that multiplies the quantized coefficient data by the first multiplier generated by the first multiplier generation unit and the second multiplier generated by the second multiplier generation unit, and a shift unit that performs bit shift operation to the data outputted from the multiplication unit according to the shift quantity data generated by the shift quantity generation unit, wherein at least one of the multiplication unit and the shift unit determines whether or not to perform the operation depending on the encoding system and/or at least one of the first multiplier generation unit, the second multiplier generation unit and the shift quantity generation unit determines a value to be generated or a way of generating the value depending on the encoding system.

According to this configuration, the first multiplier generation unit generates a first multiplier for applying operation to the quantized coefficient data, the second multiplier generation unit generates a second multiplier for applying operation to the quantized coefficient data and the shift quantity generation unit generates shift quantity data indicating a bit shift quantity for applying operation to the quantized coefficient data. The multiplication unit then multiplies the quantized coefficient data by the first multiplier and the second multiplier, the shift unit performs bit shift operation to the data outputted from the multiplication unit according to the shift quantity data. At least one of the multiplication unit and the shift unit determines whether or not to perform operation depending on the encoding system. Furthermore, at least one of the first multiplier generation unit, second multiplier generation unit and shift quantity generation unit determines a value to be generated or a way of generating the value depending on the encoding system.

Therefore, whether or not to perform operation and a value to be generated or a way of generating the value are determined depending on the encoding system, and it is thereby possible to perform inverse quantization operable for various encoding systems by a single circuit, reduce the circuit scale and also speedily respond to a case where a new encoding system is proposed. Furthermore, a versatile inverse quantization circuit such as eliminating the necessity for redesigning an LSI or the like to perform decoding can be provided.

Furthermore, the above described inverse quantization circuit preferably further includes an addend generation unit that generates an addend for application of the operation to the quantized coefficient data and an addition unit that adds the addend generated by the addend generation unit to the data outputted from the multiplication unit, wherein the shift unit performs bit shift operation to the data outputted from the addition unit according to the shift quantity data generated by the shift quantity generation unit, at least one of the multiplication unit, the addition unit and the shift unit determines whether or not to perform the operation depending on the encoding system and/or at least one of the first multiplier generation unit, the second multiplier generation unit, the addend generation unit and the shift quantity generation unit determines a value to be generated or a way of generating the value depending on the encoding system.

According to this configuration, the addend generation unit generates an addend for application of the operation to the quantized coefficient data and the addition unit adds the addend generated by the addend generation unit to the data outputted from the multiplication unit. Furthermore, the shift unit performs bit shift operation to the data outputted from the addition unit according to the shift quantity data generated by the shift quantity generation unit. At least one of the multiplication unit, the addition unit and the shift unit determines whether or not to perform the operation depending on the encoding system. Furthermore, at least one of the first multiplier generation unit, the second multiplier generation unit, the addend generation unit and the shift quantity generation unit determines a value to be generated or a way of generating the value depending on the encoding system.

Therefore, it is possible to apply operation of adding an addend to the data outputted from the multiplication unit and further perform inverse quantization according to various encoding systems by a single circuit.

Furthermore, in the above described inverse quantization circuit, the first multiplier generation unit preferably generates the first multiplier including a quantization scale value indicating a quantization width and the second multiplier generation unit generates the second multiplier including a quantization matrix value indicating a quantization width for each frequency.

According to this configuration, the first multiplier generation unit generates the first multiplier including a quantization scale value indicating a quantization width and the second multiplier generation unit generates the second multiplier including a quantization matrix value indicating a quantization width for each frequency. Therefore, it is possible to perform operation of multiplying a quantization scale value indicating the quantization width and perform operation of multiplying a quantization matrix value indicating the quantization width for each frequency.

Furthermore, in the above described inverse quantization circuit, the first multiplier generation unit preferably includes a scale value generation section that generates the quantization scale value and a scale processing section that applies operation to the quantization scale value and outputs one of the quantization scale value and the value obtained through the operation as the first multiplier, and the second multiplier generation unit includes a matrix value generation section that generates the quantization matrix value for each frequency and outputs the generated quantization matrix value as the second multiplier.

According to this configuration, the scale value generation section generates a quantization scale value, the scale processing section applies operation to a quantization scale value and one value of the quantization scale value and value obtained through the operation is outputted as the first multiplier. Furthermore, the matrix value generation section generates a quantization matrix value for each frequency and the generated quantization matrix value is outputted as a second multiplier.

Therefore, it is possible to generate a quantization scale value, apply operation to the generated quantization scale value and output one value of the quantization scale value and the value obtained through the operation as the first multiplier. Furthermore, it is also possible to generate a quantization matrix value for each frequency and output the generated quantization matrix value as the second multiplier.

Furthermore, in the above described inverse quantization circuit, the scale processing section preferably outputs one of the quantization scale value, the value obtained by performing operation to the quantization scale value and a predetermined constant value as the first multiplier, and the matrix value generation section outputs one of the quantization matrix value for each frequency and a predetermined constant value as the second multiplier.

According to this configuration, one of the quantization scale value, the value obtained by performing operation to the quantization scale value and a predetermined constant value is outputted as the first multiplier and one of the quantization matrix value for each frequency and a predetermined constant value is outputted as the second multiplier.

Therefore, it is possible to apply operation of multiplying one of the quantization scale value, the value obtained by performing operation to the quantization scale value and a predetermined constant value and apply operation of multiplying one of the quantization matrix value and a predetermined constant value and further perform inverse quantization operable for various encoding systems by a single circuit.

Furthermore, in the above described inverse quantization circuit, the addend generation unit preferably includes a multiplier that multiplies the quantization scale value generated by the scale value generation section and the quantization matrix value generated by the matrix value generation section and a selection unit that selects one value of the quantization scale value, the quantization matrix value and the value obtained by multiplying the quantization scale value and the quantization matrix value, and supplies the selected value to the addition unit as the addend.

According to this configuration, the multiplier multiplies the quantization scale value generated through the scale value generation section by the quantization matrix value generated through the matrix value generation section. The selection unit then selects one value of the quantization scale value, quantization matrix value and the value obtained by multiplying the quantization scale value and quantization matrix value and supplies the selected value to the addition unit as an addend.

Therefore, it is possible to apply operation of adding one value of the quantization scale value, quantization matrix value and the value obtained by multiplying the quantization scale value and quantization matrix value, and further perform inverse quantization operable for various encoding systems by a single circuit.

Furthermore, in the above described inverse quantization circuit, the selection unit preferably selects one value of the quantization scale value, the quantization matrix value, the value obtained by multiplying the quantization scale value and the quantization matrix value and a predetermined constant value and supplies the selected value to the addition unit as the addend.

According to this configuration, one value of the quantization scale value, quantization matrix value, the value obtained by multiplying the quantization scale value and quantization matrix value and a predetermined constant value is selected and the selected value is supplied to the addition unit as an addend.

Therefore, it is possible to apply operation of adding one value of the quantization scale value the quantization matrix value, the value obtained by multiplying the quantization scale value and the quantization matrix value and a predetermined constant value and further perform inverse quantization operable for various encoding systems by a single circuit.

Furthermore, the scale value generation section in the above described inverse quantization circuit preferably includes one or a plurality of types of scale conversion unit that converts the supplied data to a quantization scale value.

According to this configuration, since the supplied data is converted to a quantization scale value by one or a plurality of types of the scale conversion unit, it is possible to change conversion contents of the scale conversion unit depending on the encoding system.

Furthermore, the scale value generation section in the above described inverse quantization circuit preferably includes one or a plurality of types of first scale conversion unit that converts supplied data to a quantization scale value, a second scale conversion unit that further converts the quantization scale value converted by the first scale conversion unit and a selection unit that selects one of the quantization scale value converted by the first scale conversion unit and the quantization scale value converted by the second scale conversion unit and outputs the selected quantization scale value to the scale processing section.

According to this configuration, the supplied data is converted to a quantization scale value by one or a plurality of types of first scale conversion unit and the quantization scale value converted by the first scale conversion unit is further converted by the second scale conversion unit. The selection unit selects one of the quantization scale value converted by the first scale conversion unit and quantization scale value converted by the second scale conversion unit and outputs the selected quantization scale value to the scale processing section.

Therefore, it is possible to apply operation using one of the quantization scale value converted by the first scale conversion unit and the quantization scale value converted by the second scale conversion unit and further perform inverse quantization according to various encoding systems by a single circuit.

Furthermore, in the above described inverse quantization circuit, the scale processing section preferably includes an operation unit that applies operation to the quantization scale value generated by the scale value generation section and a selection unit that selects one of the quantization scale value generated by the scale value generation section, the quantization scale value subjected to operation by the operation unit and a predetermined constant value and outputs the selected value as the first multiplier.

According to this configuration, the operation unit performs operation to the quantization scale value generated by the scale value generation section, the selection unit selects one value of the quantization scale value generated by the scale value generation section, the quantization scale value subjected to operation by the operation unit and a predetermined constant value and outputs the selected value as the first multiplier.

Therefore, it is possible to perform operation using one value of the quantization scale value, quantization scale value subjected to operation and a predetermined constant value and further perform inverse quantization operable for various encoding systems by a single circuit.

Furthermore, in the above described inverse quantization circuit, the selection unit of the scale processing section preferably selects one value of the quantization scale value generated by the scale value generation section, quantization scale value subjected to operation by the operation unit and a predetermined constant value depending on the type of the quantized coefficient data.

According to this configuration, one value of the quantization scale value generated by the scale value generation section, quantization scale value subjected to operation by the operation unit and a predetermined constant value is selected depending on the type of the quantized coefficient data. It is possible to change a value to be selected depending on the type of quantized coefficient data and perform inverse quantization according to various encoding systems.

Furthermore, in the above described inverse quantization circuit, the shift quantity generation unit preferably includes a shift quantity conversion unit that converts the quantization scale value outputted from the scale conversion unit of the scale value generation section to the shift quantity data.

According to this configuration, the shift quantity conversion unit converts the quantization scale value outputted from the scale conversion unit of the scale value generation section to shift quantity data, and can thereby generate shift quantity data from the quantization scale value.

Furthermore, in the above described inverse quantization circuit, the shift quantity generation unit preferably includes a selection unit that selects one of the shift quantity data converted by the shift quantity conversion unit and a predetermined constant value as the shift quantity data and supplies the selected shift quantity data to the shift unit.

According to this configuration, one of the shift quantity data converted by the shift quantity conversion unit and a predetermined constant value is selected as shift quantity data and the selected shift quantity data is supplied to the shift unit. Therefore, it is possible to perform bit shift operation using one of the shift quantity data converted by the shift quantity conversion unit and a predetermined constant value and further perform inverse quantization operable for various encoding systems by a single circuit.

Furthermore, in the above described inverse quantization circuit, the selection unit of the shift quantity generation unit preferably selects one of the shift quantity data converted by the shift quantity conversion unit and a predetermined constant value depending on the type of quantized coefficient data.

According to this configuration, one of the shift quantity data converted by the shift quantity conversion unit and a predetermined constant value is selected depending on the type of quantized coefficient data, and it is thereby possible to change the value used for bit shift operation depending on the type of quantized coefficient data and perform inverse quantization operable for various encoding systems.

Furthermore, in the above described inverse quantization circuit, the shift quantity generation unit preferably further includes an adder that supplies a value resulting from addition of a shift addend to the shift quantity data converted by the shift quantity conversion unit to the shift unit as shift quantity data.

According to this configuration, the adder supplies a value resulting from addition of a shift addend to the shift quantity data converted by the shift quantity conversion unit to the shift unit as shift quantity data. Therefore, it is possible to perform operation of adding a shift addend to the shift quantity data and further perform inverse quantization operable for various encoding systems by a single circuit.

Furthermore, in the above described inverse quantization circuit, the adder preferably adds a selected shift addend to the shift quantity data converted by the shift quantity conversion unit depending on the type of quantized coefficient data.

According to this configuration, a selected shift addend is added to the shift quantity data converted by the shift quantity conversion unit depending on the type of quantized coefficient data, and it is thereby possible to change a shift addend to be added to the shift quantity data depending on the type of quantized coefficient data and perform inverse quantization operable for various encoding systems.

Furthermore, in the above described inverse quantization circuit, the shift unit preferably performs bit shift operation of bit-shifting data outputted from the addition unit by a number of bits in accordance with the shift quantity data generated by the shift quantity generation unit.

According to this configuration, bit shift operation is performed on the data outputted from the addition unit whereby the data is bit-shifted by a number of bits in accordance with the shift quantity data generated by the shift quantity generation unit. Therefore, it is possible to perform bit shift operation of bit-shifting the data outputted from the addition unit by a number of bits in accordance with the shift quantity data.

Furthermore, in the above described inverse quantization circuit, the multiplication unit preferably selects one value of a value resulting from multiplication of the quantized coefficient data by the first multiplier, a value resulting from multiplication of the quantized coefficient data by the second multiplier and a value resulting from multiplication of the quantized coefficient data by the first multiplier and the second multiplier and supplies the selected value to the addition unit as output data.

According to this configuration, one value of the value resulting from multiplication of the quantized coefficient data by the first multiplier, the value resulting from multiplication of the quantized coefficient data by the second multiplier and the value resulting from multiplication of the quantized coefficient data by the first multiplier and the second multiplier is selected and the selected value is supplied to the addition unit as output data.

Therefore, it is possible to supply one value of the value resulting from multiplication of the quantized coefficient data by the first multiplier, the value resulting from multiplication of the quantized coefficient data by the second multiplier and the value resulting from multiplication of the quantized coefficient data by the first multiplier and the second multiplier to the addition unit and further perform inverse quantization operable for various encoding systems by a single circuit.

Furthermore, in the above described inverse quantization circuit, the selection function of the multiplication unit preferably selects one value of a value resulting from multiplication of the quantized coefficient data by the first multiplier, a value resulting from multiplication of the quantized coefficient data by the second multiplier and a value resulting from multiplication of the quantized coefficient data by the first multiplier and the second multiplier depending on the type of quantized coefficient data.

According to this configuration, one value of the value resulting from multiplication of the quantized coefficient data by the first multiplier, the value resulting from multiplication of the quantized coefficient data by the second multiplier and the value resulting from multiplication of the quantized coefficient data by the first multiplier and the second multiplier is selected depending on the type of quantized coefficient data. Therefore, it is possible to change a value outputted from the multiplication unit depending on the type of quantized coefficient data and perform inverse quantization operable for various encoding systems.

Furthermore, in the above described inverse quantization circuit, the addition unit preferably selects one value of a value of data supplied from the multiplication unit and a value resulting from addition of the addend generated by the addend generation unit to the data supplied from the multiplication unit and supplies the selected value to the shift unit as output data.

According to this configuration, one value of the value of data supplied from the multiplication unit and the value resulting from addition of the addend generated by the addend generation unit to the data supplied from the multiplication unit is selected and the selected value is supplied to the shift unit as output data.

Therefore, it is possible to supply one value of the value of data supplied from the multiplication unit and the value resulting from addition of the addend generated by the addend generation unit to the data supplied from the multiplication unit to the shift unit and further perform inverse quantization operable for various encoding systems by a single circuit.

Furthermore, in the above described inverse quantization circuit, the shift unit preferably selects one value of a value of data supplied from the addition unit and a value obtained through the bit shift operation and outputs the selected value as output data.

According to this configuration, one value of a value of data supplied from the addition unit and a value obtained through the bit shift operation is selected and the selected value is outputted as output data.

Therefore, it is possible to output one value of the value of data supplied from the addition unit and the value obtained through the bit shift operation from the shift unit and further perform inverse quantization operable for various encoding systems by a single circuit.

Furthermore, the above described inverse quantization circuit is preferably further provided with a rounding unit that performs rounding processing by adding a value in accordance with the shift quantity data generated by the shift quantity generation unit to the output data from the addition unit, selectively switches between the processed data subjected to the rounding processing and non-processed data not subjected to the rounding processing and outputs the data to the shift unit.

According to this configuration, rounding processing is performed by adding a value in accordance with the shift quantity data generated by the shift quantity generation unit to the output data from the addition unit and the processed data subjected to the rounding processing and non-processed data not subjected to the rounding processing are selectively switched and outputted to the shift unit. Therefore, it is possible to perform inverse quantization operable for the encoding system whereby rounding processing is performed and further perform inverse quantization operable for various encoding systems by a single circuit.

Furthermore, in the above described inverse quantization circuit, the rounding unit preferably performs the rounding processing only when bit shift operation in the shift unit is a shift in the rightward direction by adding a value in accordance with the shift quantity data generated by the shift quantity generation unit to the output data from the addition unit.

According to this configuration, the rounding processing is performed only when bit shift operation in the shift unit is a shift in the rightward direction by adding a value in accordance with the shift quantity data generated by the shift quantity generation unit to the output data from the addition unit. Therefore, since the rounding processing is performed only when bit shift operation in the shift unit is a shift in the rightward direction, it is possible to perform inverse quantization operable for the encoding system of shifting bits to the right and further perform inverse quantization operable for various encoding systems by a single circuit.

Furthermore, the above described inverse quantization circuit is preferably further provided with a post-processing unit that includes an operation function that performs discrete cosine transform mismatch control processing on the data outputted from the shift unit and an operation function that performs saturation processing capable of setting a range of clipping the data outputted from the shift unit, selectively switches between processed data and non-processed data in the discrete cosine transform mismatch control processing and the saturation processing respectively, and outputs the data.

According to this configuration, the operation function that performs discrete cosine transform mismatch control processing on the data outputted from the shift unit and the operation function that performs saturation processing capable of setting a range of clipping the data outputted from the shift unit selectively switch between processed data and non-processed data and output the data respectively.

Therefore, since processed data subjected to discrete cosine transform mismatch control processing and non-processed data not subjected to discrete cosine transform mismatch control processing are selectively outputted and processed data subjected to saturation processing and non-processed data not subjected to saturation processing are selectively outputted, it is possible to perform inverse quantization operable for the encoding system whereby discrete cosine transform mismatch control processing is performed and the encoding system whereby saturation processing is performed and further perform inverse quantization operable for various encoding systems by a single circuit.

Furthermore, in the above described inverse quantization circuit, the post-processing unit can preferably set conditions for setting the discrete cosine transform mismatch control processing. According to this configuration, it is possible to set conditions for performing discrete cosine transform mismatch control processing depending on the encoding system.

Furthermore, in the above described inverse quantization circuit, the post-processing unit can preferably control whether or not to perform the discrete cosine transform mismatch control processing depending on the type of the quantized coefficient data. According to this configuration, it is possible to control whether or not to perform the discrete cosine transform mismatch control processing depending on the type of quantized coefficient data.

Furthermore, in the above described inverse quantization circuit, the post-processing unit can preferably control operation contents of the discrete cosine transform mismatch control processing. According to this configuration, it is possible to control operation contents of the discrete cosine transform mismatch control processing.

Furthermore, in the above described inverse quantization circuit, the post-processing unit preferably performs the discrete cosine transform mismatch control processing before or after the saturation processing. According to this configuration, since the discrete cosine transform mismatch control processing is carried out before or after the saturation processing, it is possible to perform inverse quantization operable for the encoding system whereby discrete cosine transform mismatch control processing is performed before the saturation processing and the encoding system whereby discrete cosine transform mismatch control processing is performed after the saturation processing.

Furthermore, the above described inverse quantization circuit is preferably further provided with a pre-processing unit that includes an operation function that multiplies the quantized coefficient data by an integer and an operation function that adds an addend for a dead zone to the quantized coefficient data, selectively switches between data subjected to operation and data not subjected to operation and outputs the data in the operation of multiplying the quantized coefficient data by an integer and the operation of adding the addend to the quantized coefficient data respectively.

According to this configuration, the operation function that multiplies the quantized coefficient data by an integer and the operation function that adds an addend for a dead zone to the quantized coefficient data selectively switch the data subjected to operation and the data not subjected to operation and output the data respectively.

Therefore, the data subjected to operation with quantized coefficient data multiplied by an integer and the data not subjected to operation with quantized coefficient data not multiplied by an integer are selectively outputted and the data subjected to operation with an addend for the dead zone added to the quantized coefficient data and the data not subjected to operation with an addend for the dead zone not added to the quantized coefficient data are selectively outputted, and it is thereby possible to perform inverse quantization operable for the encoding system whereby the quantized coefficient data is multiplied by an integer and the encoding system whereby an addend for the dead zone is added to the quantized coefficient data and further perform inverse quantization operable for various encoding systems by a single circuit.

An inverse quantization method according to another aspect of the present invention is an inverse quantization method for applying operation to quantized coefficient data resulting from quantization of a coefficient value for each frequency calculated by transforming image data based on an encoding system, thereby performing inverse quantization and reconstructing the coefficient value, including a first multiplier generating step of generating a first multiplier for application of the operation to the quantized coefficient data, a second multiplier generating step of generating a second multiplier for application of the operation to the quantized coefficient data, a shift quantity generating step of generating shift quantity data indicating a bit shift quantity for application of the operation to the quantized coefficient data, a multiplication processing step of multiplying the quantized coefficient data by the first multiplier generated in the first multiplier generating step and the second multiplier generated in the second multiplier generating step and a shift processing step of performing bit shift operation to the data outputted in the multiplication processing step according to the shift quantity data generated in the shift quantity generating step, wherein at least one of the multiplication processing step and the shift processing step determines whether or not to perform the operation depending on the encoding system and/or at least one of the first multiplier generating step, the second multiplier generating step and the shift quantity generating step determines the value to be generated or the way of generating the value depending on the encoding system.

According to this configuration, the first multiplier for applying operation to the quantized coefficient data is generated in the first multiplier generating step, the second multiplier for applying operation to the quantized coefficient data is generated in the second multiplier generating step and shift quantity data indicating a bit shift quantity for applying operation to the quantized coefficient data is generated in the shift quantity generating step. The quantized coefficient data is multiplied by the first multiplier and the second multiplier in the multiplication processing step and bit shift operation is performed on the data outputted from the multiplication unit according to the shift quantity data in the shift processing step. At least one of the multiplication processing step and the shift processing step determines whether or not to perform operation depending on the encoding system. Furthermore, at least one of the first multiplier generating step, the second multiplier generating step and the shift quantity generating step determines a value to be generated or a way of generating the value depending on the encoding system.

Therefore, since whether or not to perform operation and a value to be generated or a way of generating the value are determined depending on the encoding system, it is possible to perform inverse quantization operable for various encoding systems by a single circuit, reduce the circuit scale and also speedily respond to the case where a new encoding system is proposed. Furthermore, it is possible to provide a versatile inverse quantization method that eliminates the necessity for redesigning an LSI or the like for performing decoding or the like.

An image reproducing apparatus according to another aspect of the present invention includes a quantized coefficient data acquiring unit that acquires quantized coefficient data, an inverse quantization circuit that reconstructs a coefficient value by inverse-quantizing the quantized coefficient data acquired by the quantized coefficient data acquiring unit, a transforming unit that transforms the coefficient value reconstructed by the inverse quantization circuit to image data and an output unit that outputs the image data transformed by the transforming unit.

According to this configuration, the quantized coefficient data acquiring unit acquires quantized coefficient data and the inverse quantization circuit inverse-quantizes the quantized coefficient data acquired by the quantized coefficient data acquiring unit and thereby reconstructs the coefficient value. The transforming unit transforms the coefficient value reconstructed by the inverse quantization circuit to image data and the output unit outputs the image data transformed by the transforming unit.

Therefore, the above described inverse quantization circuit is applicable for example, to an image reproducing apparatus such as a personal computer, set top box, portable information terminal apparatus and cellular phone.

INDUSTRIAL APPLICABILITY

The inverse quantization circuit and the inverse quantization method according to the present invention can be used, for example, for an integrated circuit provided with a function of applying decoding to encoded data, which is encoded data based on an image encoding system and an information device provided with such an integrated circuit such as a personal computer, set top box, portable information terminal apparatus or cellular phone and other apparatuses.

The invention claimed is:

1. An inverse quantization circuit that adaptively handles performance of inverse quantization for plural encoding systems by selectively performing operations depending on a present encoding system from among the plural encoding systems, said inverse quantization circuit comprising:

a first multiplier generation unit that generates a first multiplier, wherein the first multiplier generation unit determines the first multiplier or a way of generating the first multiplier depending on the present encoding system;

a second multiplier generation unit that generates a second multiplier, wherein the second multiplier generation unit determines the second multiplier or a way of generating the second multiplier depending on the present encoding system;

a shift quantity generation unit that generates shift quantity data indicating a bit shift quantity;

a multiplication unit that determines whether or not to perform a multiplication operation depending on the present encoding system, and when determined affirmatively, performs the multiplication operation which comprises multiplying quantized coefficient data by the first multiplier generated by the first multiplier generation unit and the second multiplier generated by the second multiplier generation unit, wherein the quantized coefficient data is a result of quantization of a coefficient value for each frequency obtained by transforming image data based on an encoding system;

a shift unit that determines whether or not to perform a bit shift operation depending on the present encoding system, and when determined affirmatively, performs the bit shift operation to the data outputted from the multiplication unit according to the shift quantity data generated by the shift quantity generation unit;

an addend generation unit that generates an addend, wherein the addend generation unit determines the addend or a way of generating the addend depending on the present encoding system; and an addition unit that determines whether or not to perform an addition operation depending on the present encoding system, and when determined affirmatively, performs the addition operation which comprises adding the addend generated by the addend generation unit to the data outputted from the multiplication unit, wherein the shift unit performs the bit shift operation to the data outputted from the addition unit or to the data outputted from the multiplication unit depending on the present encoding system, according to the shift quantity data generated by the shift quantity generation unit.

2. The inverse quantization circuit according to claim 1, wherein the first multiplier generation unit generates the first multiplier including a quantization scale value indicating a quantization width, and the second multiplier generation unit generates the second multiplier including a quantization matrix value indicating a quantization width for each frequency.

3. The inverse quantization circuit according to claim 1, wherein the multiplication unit selects one value of a value resulting from multiplication of the quantized coefficient data by the first multiplier, a value resulting from multiplication of the quantized coefficient data by the second multiplier and a value resulting from multiplication of the quantized coefficient data by the first multiplier and the second multiplier and supplies the selected value to the addition unit as output data.

4. The inverse quantization circuit according to claim 1, wherein the addition unit selects one value of a value of data supplied from the multiplication unit and a value resulting from addition of the addend generated by the addend generation unit to the data supplied from the multiplication unit and supplies the selected value to the shift unit as output data.

5. The inverse quantization circuit according to claim 1, wherein the shift unit selects one value of a value of data supplied from the addition unit and a value obtained through the bit shift operation and outputs the selected value as output data.

6. The inverse quantization circuit according to claim 1, further comprising a rounding unit that performs rounding processing by adding a value in accordance with the shift quantity data generated by the shift quantity generation unit to the output data from the addition unit, selectively switches between the processed data subjected to the rounding processing and non-processed data not subjected to the rounding processing and outputs the data to the shift unit.

7. An inverse quantization circuit that adaptively handles performance of inverse quantization for plural encoding systems by selectively performing operations depending on a present encoding system from among the plural encoding systems, said inverse quantization circuit comprising:

a first multiplier generation unit that generates a first multiplier, wherein the first multiplier generation unit determines the first multiplier or a way of generating the first multiplier depending on the present encoding system;

a second multiplier generation unit that generates a second multiplier, wherein the second multiplier generation unit determines the second multiplier or a way of generating the second multiplier depending on the present encoding system;

a shift quantity generation unit that generates shift quantity data indicating a bit shift quantity;

a multiplication unit that determines whether or not to perform a multiplication operation depending on the present encoding system, and when determined affirmatively, performs the multiplication operation which comprises multiplying quantized coefficient data by the first multiplier generated by the first multiplier generation unit and the second multiplier generated by the second multiplier generation unit, wherein the quantized coefficient data is a result of quantization of a coefficient value for each frequency obtained by transforming image data based on an encoding system; and a shift unit that determines whether or not to perform a bit shift operation depending on the present encoding system, and when determined affirmatively, performs the bit shift operation to the data outputted from the multiplication unit according to the shift quantity data generated by the shift quantity generation unit, wherein the first multiplier generation unit generates the first multiplier including a quantization scale value indicating a quantization width, wherein the second multiplier generation unit generates the second multiplier including a quantization matrix value indicating a quantization width for each frequency, wherein the first multiplier generation unit comprises:

a scale value generation section that generates the quantization scale value; and a scale processing section that applies an operation to the quantization scale value and outputs one of the quantization scale value and the value obtained through the operation as the first multiplier, and wherein the second multiplier generation unit comprises a matrix value generation section that generates the quantization matrix value for each frequency and outputs the generated quantization matrix value as the second multiplier.

8. The inverse quantization circuit according to claim 7, wherein the scale processing section outputs one of the quantization scale value, the value obtained by performing the operation to the quantization scale value and a predetermined constant value as the first multiplier, and the matrix value generation section outputs one of the quantization matrix value for each frequency and a predetermined constant value as the second multiplier.

9. The inverse quantization circuit according to claim 7, wherein the addend generation unit comprises:

a multiplier that multiplies the quantization scale value generated by the scale value generation section and the quantization matrix value generated by the matrix value generation section; and a selection unit that selects one value of the quantization scale value, the quantization matrix value and the value obtained by multiplying the quantization scale value and the quantization matrix value and supplies the selected value to the addition unit as the addend.

10. The inverse quantization circuit according to claim 9, wherein the selection unit selects one value of the quantization scale value, the quantization matrix value, the value obtained by multiplying the quantization scale value and the quantization matrix value and a predetermined constant value and supplies the selected value to the addition unit as the addend.

11. The inverse quantization circuit according to claim 7, wherein the scale value generation section comprises:

one or a plurality of types of first scale conversion unit that converts supplied data to a quantization scale value;

a second scale conversion unit that further converts the quantization scale value converted by the first scale conversion unit; and a selection unit that selects one of the quantization scale value converted by the first scale conversion unit and the quantization scale value converted by the second scale conversion unit and outputs the selected quantization scale value to the scale processing section.

12. The inverse quantization circuit according to claim 11, wherein the shift quantity generation unit comprises a shift quantity conversion unit that converts the quantization scale value outputted from the scale conversion unit of the scale value generation section to the shift quantity data.

13. The inverse quantization circuit according to claim 12, wherein the shift quantity generation unit comprises a selection unit that selects one of the shift quantity data converted by the shift quantity conversion unit and a predetermined constant value as the shift quantity data and supplies the selected shift quantity data to the shift unit.

14. The inverse quantization circuit according to claim 12, wherein the shift quantity generation unit further comprises an adder that supplies a value resulting from addition of a shift addend to the shift quantity data converted by the shift quantity conversion unit to the shift unit as shift quantity data.

15. The inverse quantization circuit according to claim 7, wherein the scale processing section comprises:

an operation unit that applies an operation to the quantization scale value generated by the scale value generation section; and a selection unit that selects one of the quantization scale value generated by the scale value generation section, the quantization scale value subjected to the operation by the operation unit and a predetermined constant value and outputs the selected value as the first multiplier.

16. An inverse quantization circuit that adaptively handles performance of inverse quantization for plural encoding systems by selectively performing operations depending on a present encoding system from among the plural encoding systems, said inverse quantization circuit comprising:

a first multiplier generation unit that generates a first multiplier, wherein the first multiplier generation unit determines the first multiplier or a way of generating the first multiplier depending on the present encoding system;

a second multiplier generation unit that generates a second multiplier, wherein the second multiplier generation unit determines the second multiplier or a way of generating the second multiplier depending on the present encoding system;

a shift quantity generation unit that generates shift quantity data indicating a bit shift quantity;

a multiplication unit that determines whether or not to perform a multiplication operation depending on the present encoding system, and when determined affirmatively, performs the multiplication operation which comprises multiplying quantized coefficient data by the first multiplier generated by the first multiplier generation unit and the second multiplier generated by the second multiplier generation unit, wherein the quantized coefficient data is a result of quantization of a coefficient value for each frequency obtained by transforming image data based on an encoding system;

a shift unit that determines whether or not to perform a bit shift operation depending on the present encoding system, and when determined affirmatively, performs the bit shift operation to the data outputted from the multiplication unit according to the shift quantity data generated by the shift quantity generation unit; and a post-processing unit that includes an operation function that performs discrete cosine transform mismatch control processing on the data outputted from the shift unit and an operation function that performs saturation processing capable of setting a range of clipping the data outputted from the shift unit, selectively switches between processed data and non-processed data in the discrete cosine transform mismatch control processing and the saturation processing respectively, and outputs the data.

17. An inverse quantization circuit that adaptively handles performance of inverse quantization for plural encoding systems by selectively performing operations depending on a present encoding system from among the plural encoding systems, said inverse quantization circuit comprising:

a first multiplier generation unit that generates a first multiplier, wherein the first multiplier generation unit determines the first multiplier or a way of generating the first multiplier depending on the present encoding system;

a second multiplier generation unit that generates a second multiplier, wherein the second multiplier generation unit determines the second multiplier or a way of generating the second multiplier depending on the present encoding system;

a shift quantity generation unit that generates shift quantity data indicating a bit shift quantity;

a multiplication unit that determines whether or not to perform a multiplication operation depending on the present encoding system, and when determined affirmatively, performs the multiplication operation which comprises multiplying quantized coefficient data by the first multiplier generated by the first multiplier generation unit and the second multiplier generated by the second multiplier generation unit, wherein the quantized coefficient data is a result of quantization of a coefficient value for each frequency obtained by transforming image data based on an encoding system;

a shift unit that determines whether or not to perform a bit shift operation depending on the present encoding system, and when determined affirmatively, performs the bit shift operation to the data outputted from the multiplication unit according to the shift quantity data generated by the shift quantity generation unit; and a pre-processing unit which includes an operation function that multiplies the quantized coefficient data by an integer and an operation function that adds an addend for a dead zone to the quantized coefficient data, selectively switches between data subjected to operation and data not subjected to operation and outputs the data in the operation of multiplying the quantized coefficient data by an integer and the operation of adding the addend to the quantized coefficient data respectively.

18. An inverse quantization method that adaptively handles performance of inverse quantization for plural encoding systems by selectively performing operations depending on a present encoding system from among the plural encoding systems, said method comprising:

a first multiplier generating step of generating a first multiplier, wherein the first multiplier generating step determines the first multiplier or a way of generating the first multiplier depending on the present encoding system;

a second multiplier generating step of generating a second multiplier, wherein the second multiplier generating step determines the second multiplier or a way of generating the second multiplier depending on the present encoding system;

a shift quantity generating step of generating shift quantity data indicating a bit shift quantity;

a multiplication processing step of determining whether or not to perform a multiplication operation depending on the present encoding system, and when determined affirmatively, performing the multiplication operation which comprises multiplying quantized coefficient data by the first multiplier generated in the first multiplier generating step and the second multiplier generated in the second multiplier generating step, wherein the quantized coefficient data is a result of quantization of a coefficient value for each frequency obtained by transforming image data based on an encoding system;

a shift processing step of determining whether or not to perform a bit shift operation depending on the present encoding system, and when determined affirmatively, performing the bit shift operation to the data outputted in the multiplication processing step according to the shift quantity data generated in the shift quantity generating step;

an addend generating step of generating an addend, wherein the addend generating step determines the addend or a way of generating the addend depending on the present encoding system; and an addition processing step of determining whether or not to perform an addition operation depending on the present encoding system, and when determined affirmatively, performs the addition operation which comprises adding the addend generated in the addend generating step to the data outputted in the multiplication processing step, wherein the shift processing step performs the bit shift operation to the data outputted in the addition processing step or to the data outputted in the multiplication processing step depending on the present encoding system, according to the shift quantity data generated in the shift quantity generating step.

19. An image reproducing apparatus comprising:

a quantized coefficient data acquiring unit that acquires quantized coefficient data;

an inverse quantization circuit according to claim 1 that reconstructs a coefficient value by inverse-quantizing the quantized coefficient data acquired by the quantized coefficient data acquiring unit;

a transforming unit that transforms the coefficient value reconstructed by the inverse quantization circuit to image data; and an output unit that outputs the image data transformed by the transforming unit.

* * * * *